United States Patent
Castro Castro et al.

(10) Patent No.: US 10,841,835 B2
(45) Date of Patent: Nov. 17, 2020

(54) MAXIMUM BIT RATE CONTROL IN A MULTI-ACCESS NETWORK

(71) Applicant: Telefonaktiebolaget LM Ericsson (Publ), Stockholm (SE)

(72) Inventors: Fabian Castro Castro, A Coruña (ES); Susana Fernandez Alonso, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 134 days.

(21) Appl. No.: 15/753,883

(22) PCT Filed: Aug. 26, 2015

(86) PCT No.: PCT/EP2015/069512
§ 371 (c)(1),
(2) Date: Feb. 20, 2018

(87) PCT Pub. No.: WO2017/032413
PCT Pub. Date: Mar. 2, 2017

(65) Prior Publication Data
US 2018/0249373 A1    Aug. 30, 2018

(51) Int. Cl.
*H04W 28/08* (2009.01)
*H04W 76/16* (2018.01)
(Continued)

(52) U.S. Cl.
CPC .......... *H04W 28/08* (2013.01); *H04L 5/0064* (2013.01); *H04L 43/0888* (2013.01); *H04W 24/08* (2013.01); *H04W 76/16* (2018.02)

(58) Field of Classification Search
CPC ......... H04L 47/32; H04L 47/30; H04L 47/35; H04L 47/10
See application file for complete search history.

(56) References Cited

U.S. PATENT DOCUMENTS

| 2015/0201394 A1* | 7/2015 | Qu | H04W 4/029 455/456.1 |
| 2017/0034756 A1* | 2/2017 | Faccin | H04W 88/06 |

FOREIGN PATENT DOCUMENTS

| EP | 2501197 A1 | 9/2012 |
| EP | 2608457 A3 | 6/2013 |

(Continued)

OTHER PUBLICATIONS

International Search Report and Written Opinion dated May 3, 2016 for International Application No. PCT/EP2015/069512, consisting of 17-pages.

(Continued)

*Primary Examiner* — Hassan A Phillips
*Assistant Examiner* — Prenell P Jones
(74) *Attorney, Agent, or Firm* — Patent Portfolio Builders, PLLC

(57) ABSTRACT

Control of a maximum bit rate in a multi-access network scenario that includes a 3GPP access and a non-3GPP access. This maximum bit rate control is enforced in a wireless device having a first radio access and a second radio access to a communications network, the first radio access being a cellular communication access and the second radio access being a non-cellular communication access. The wireless device receives, via the first radio access or the second radio access, a Multi-Access User Equipment Aggregated Maximum Bit Rate, Multi-Access-UE-AMBR, value and/or a User Equipment Aggregated Maximum Bit Rate, UE-AMBR, value for the second radio access, and ensures that a bit rate of traffic generated by the wireless device and/or received by the wireless device does not surpass the received Multi-Access-UE-AMBR and/or said UE-AMBR value for the second radio access.

22 Claims, 20 Drawing Sheets

(51) Int. Cl.
*H04L 5/00* (2006.01)
*H04L 12/26* (2006.01)
*H04W 24/08* (2009.01)

(56) References Cited

FOREIGN PATENT DOCUMENTS

WO 2014110410 A1 7/2014
WO 2014169933 A1 10/2014

OTHER PUBLICATIONS

3GPP TS 23.401 V13.1.0 "3rd Generation Partnership Project; Technical Specification Group Services and System Aspects; General Packet Radio Service (GPRS) enhancements for Evolved Universal Terrestrial Radio Access Network (E-UTRAN) access"; Release 13, Dec. 2014, consisting of 310-pages.

3GPP TS 23.402 V13.0.0 "3rd Generation Partnership Project; Technical Specification Group Services and System Aspects; Architecture enhancements for non-3GPP accesses"; Release 13, Dec. 2014, consisting of 290-pages.

3GPP TS 23.861 V1.12.0 "3rd Generation Partnership Project; Technical Specification Group Services and System Aspects; Network bases IP flow mobility"; Release 13, Dec. 2014, consisting of 121-pages.

3GPP TS 23.401 V13.3.0 "3rd Generation Partnership Project; Technical Specification Group Services and System Aspects; General Packet Radio Service (GPRS) enhancements for Evolved Universal Terrestrial Radio Access Network (E-UTRAN) access"; Release 13, Jun. 2015, consisting of 324-pages.

3GPP TS 23.402 V13.2.0 "3rd Generation Partnership Project; Technical Specification Group Services and System Aspects; Architecture enhancements for non-3GPP accesses"; Release 13, Jun. 2015, consisting of 292-pages.

3GPP TS 23.203 V12.0.0 "3rd Generation Partnership Project; Technical Specification Group Services and System Aspects; Policy and charging control architecture"; Release 12, Mar. 2013, consisting of 183-pages.

3GPP TR 23.861 V13.0.0 "3rd Generation Partnership Project; Technical Specification Group Services and System Aspects; Network based IP flow mobility"; Release 13, Jun. 2015, consisting of 153-pages.

\* cited by examiner

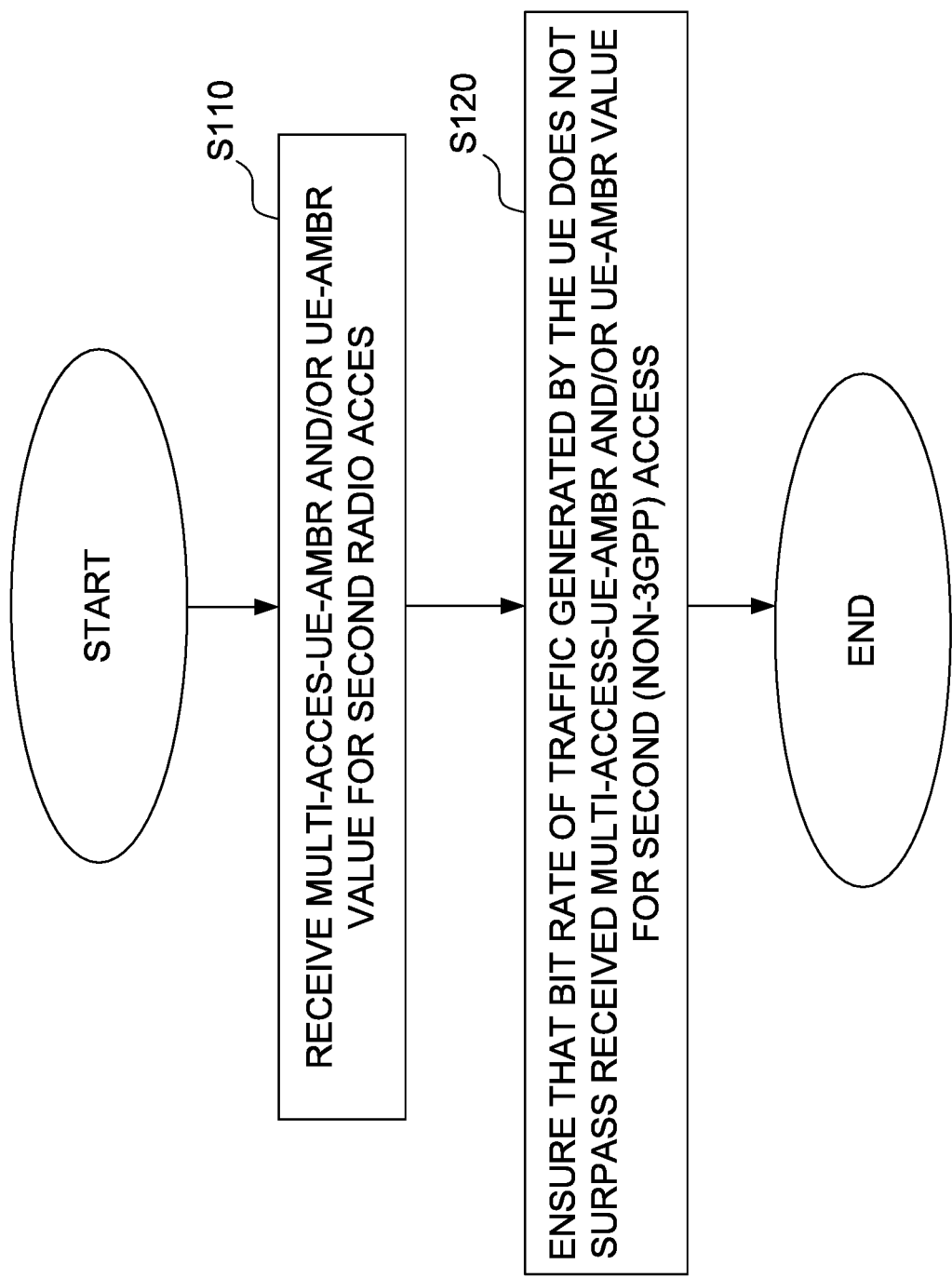

MAXIMUM BIT RATE CONTROL IN A MULTI-ACCESS NETWORK

CROSS-REFERENCE TO RELATED APPLICATIONS

This application is a Submission Under 35 U.S.C. § 371 for U.S. National Stage Patent Application of International Application Number: PCT/EP2015/069512, filed Aug. 26, 2015 entitled "MAXIMUM BIT RATE CONTROL IN A MULTI-ACCESS NETWORK," the entirety of which is incorporated herein by reference.

TECHNICAL FIELD

The present invention relates to method(s) and node(s) for handling a maximum bit rate control in a multi-access communications network, as well as to a corresponding system and computer program(s). More particularly, the present invention relates to the handling of multi-access related User Equipment Aggregated Maximum Bit Rates (UE-AMBR) associated with a wireless device in a communications network.

BACKGROUND

In a typical communications network a wireless device (UE) may communicate via a Radio Access Network (RAN) to one or more Core Networks (CNs). The communications network may also be referred to as a wireless communications network, a wireless communication system, a communications network, a communications system, a network, a system or the like.

The wireless device (UE) may be a device by which a subscriber may access services, applications, or the like, offered by an operator's network and services and applications outside the operator's network to which the operator's radio access network and the core network provide access, as, for example, access to the Internet. The wireless device may be any wireless device, mobile or stationary, that is enabled to communicate over a radio channel in the communications network, for example but not limited to a user equipment, mobile phone, smart phone, sensors, meters, vehicles, household appliances, medical appliances, media players, cameras, Machine to Machine (M2M) devices, smart watches, or any type of consumer electronics, for example, television, radio, lighting arrangements, tablet computer, laptops or personal computers. The wireless device may be portable, pocket storable, hand held, computer comprised or a vehicle mounted device, enabled to operate voice and/or data, via the radio access network, with an outer entity, such as another wireless device or a server.

Wireless devices are enabled to communicate via radio access, i.e. wirelessly within the communications network. The communication may be performed e.g. between two wireless devices, between a wireless device and a regular telephone and/or between the wireless device and a server via the radio access network and possibly one or more core networks and possibly the Internet.

A communications network may cover a geographical area which may be divided into cell areas. Each cell area may be served by at least one base station to perform cellular communications. The base station is also referred to as a Radio Base Station (RBS), evolved Node B (eNB), eNodeB, NodeB, B node or Base Transceiver Station (BTS), depending on the technology and terminology used. The communication network may have a core network which enables the coordination of a variety of radio networks and thus guarantees mobility, handover, roaming, and the like. An example of such a core network is the Evolved Packet Core (EPC), as described below.

The Evolved Packet Core (EPC) architecture for 3GPP accesses, as defined in 3GPP TS 23.401 (V.13.3.0) and illustrated in FIG. 1, shows a PGW (PDN Gateway) node, a SGW (serving gateway) node, a Policy and Charging Rules Function (PCRF) node, a MME (Mobility Management Entity) node, and a mobile/wireless device (UE) which communicate via respective interfaces as illustrated in FIG. 1 and further described in 3GPP TS 23.401 (V.13.3.0). Here, for implementing cellular communications, the LTE radio access, E-UTRAN, may comprise one or more eNBs serving respective cells. In 3GPP accesses, the radio interface between the mobile/wireless device (UE) and the E-UTRAN is specified by 3GPP, e.g. LTE. Via the one or more eNBs the UE may access the EPC, as an example of a cellular communications based access to a core network, for example access to the PGW (PDN Gateway) node. In the following, this cellular communications based radio access to a core network is also referred to as a 3GPP access of the UE.

However, this 3GPP access of the UE may not be the only radio access technology that is supported by the UE. In particular, multiple access technologies and also the handover between these accesses may be supported. That is, besides the capability to have a first, cellular based radio access, such as a 3GPP access as described above (e.g., LTE radio access via a LTE-Uu interface, i.e. the radio protocol of E-UTRAN between the UE and the eNB as specified in 3GPP TS 36.300 (V.13.0.0), or the like), a non-cellular based access technology (in the following also referred to as non-3GPP access technology), may be employed to interconnect the UE with a unit/node of the core network, for example to connect the UE with the PGW (PUN Gateway) node in the EPC. A non-3GPP access generally means that this access is not specified in the 3$^{rd}$ Generation Partnership Project (3GPP) that develops and maintains the radio telephony standards such as UMTS, GERAN (GSM), LTE. These Non-3GPP access technologies may include, e.g., WiMAX, cdma2000, WLAN, Wi-Fi. The wireless device may thus be provided with a second, different radio access to the Evolved Packet Core (EPC) architecture (Evolved 3GPP Packet Switched domain) described in FIG. 1, which is not based on cellular communications, i.e. a non-3GPP radio access, such as WLAN, Wi-Fi, or the like.

FIG. 2, as taken from 3GPP TS 23.402 (V.13.2.0), shows an extension to the EPC architecture illustrated in FIG. 1 in order to additionally allow for non-cellular-based accesses (non-3GPP accesses), e.g. a non-3GPP IP access network to access the EPC network. In such a non-3GPP access the radio interface does not involve a cellular network served by a base station, and is not specified by 3GPP.

As further shown in FIG. 2, the non-3GPP access networks may include a trusted access (e.g., a communication access between a UE and a trusted WLAN (TWAN), where the TWAN may set up non-seamless WLAN offload or an S2a tunnel to the PDN (Public Data Network) Gateway without explicit request from the UE) and/or an untrusted access. A trusted access may be considered as being managed by an operator (e.g., an operator hotspot) and may have a direct interaction with the EPC (according to FIG. 2, for example, with the PDN Gateway via the S2a interface), whereas an untrusted access is not managed by the operator (e.g., a WLAN access point at home) and the interaction with the EPC may be achieved via a network entity/node. In particular, a security gateway called ePDG may be used between the untrusted domain and the operator's network. The UE sets up a secure tunnel to the ePDG, and there is a S2b interface between the ePDG and the PGW (PDN Gateway). By comparison, a trusted 3GPP access hosts a gateway, e.g. a Trusted WLAN Access Gateway (TWAG) (see 3GPP TS 23.402, Section 16) and there is a point-to-point interface between the UE and TWAG, and an interface S2a interface between TWAG and the PGW, as illustrated in FIG. 2.

In addition, an architecture that supports Policy and Charging Control (PCC) functionality is shown in FIG. 3, taken from 3GPP TS 23.203 (V.12.0.0), and specifies the PCC functionality for Evolved 3GPP Packet Switched domain, comprising both 3GPP accesses (such as, GERAN, UTRAN, E-UTRAN, LTE) and Non-3GPP accesses (such as WLAN, Wi-Fi). The PCC functionality is comprised by the functions of the Policy and Charging Enforcement Function (PCEF) node for the PDN gateway, the Bearer Binding and Event Reporting Function (BBERF), the PCRF node, the Application Function (AF), the Traffic Detection Function (TDF), the Online Charging System (OCS), the Offline Charging System (OFCS), and the Subscription Profile Repository (SPR) or the User Data Repository (UDR).

The PCEF is a functional entity which is responsible for enforcement of policies and charging. The PCEF functionality is commonly located at a network node that handles and routes data packets sent from and/or addressed to the UE, for example a Packet data network GateWay (commonly cited by the 3GPP specifications as: PGW or PDN Gateway (GW)) or a Gateway GPRS Support Node (GGSN), and is therefore referred to as a PCEF node in the following. The PCEF is connected to the PCRF node via a Gx interface. The PCEF encompasses service data flow detection (based on filter definitions included in the PCC rules), as well as online and offline charging interactions and policy enforcement. Since the PCEF is the entity handling the bearers (described below) it is one of the functional entities where the Quality of Service (QoS) is being enforced for the bearer according to the QoS information coming from the PCRF node. The PCEF functionality is commonly located at the Gateway (e.g. GGSN in the General Packet Radio Service, GPRS, case, and PGW in the Evolved Packet Core, EPC, case). For the cases where there is PMIP instead of GTP protocol between BBERF and PCEF, the bearer control is done in the BBERF instead. The PCEF further has a Gz interface towards the OFCS and a Gy interface towards the OCS.

The PCRF node is a node which takes decisions regarding policy control and has flow based charging control functionality. The PCRF node provides network control regarding the service data flow detection, gating, QoS and flow based charging (except credit management) towards the PCEF node. The PCRF node receives session and media related information from the AF and informs the AF of traffic plane events. The PCRF node may provision PCC Rules to the PCEF node via the Gx reference point. The PCRF node may inform the PCEF node through the use of PCC rules as to the treatment of each service flow that is under PCC control, in accordance with the PCRF node policy decision(s). The PCRF node determines the PCC rules based on, for example, information from the AF obtained via the Rx interface, information from the PCEF node via the Gx interface, information from the SPR, obtained via the Sp interface and information from the BBERF node obtained via the Gxx interface. The PCRF node may provision QoS Rules to the BBERF node via the Gxx reference point (for deployments based on the Proxy Mobile IPv6 (PMIP)/Dual Stack Mobile IPv6 (DSMIP) protocol in the core network). Further, the PCRF node further has an Sd interface towards a TOE and a Sy interface towards the OCS.

The AF 108 is an unit/node offering applications in which service is delivered in a different layer (i.e. transport layer) from the one the service has been requested (i.e. signaling layer), the control of Internet Protocol (IP) bearer resources according to what has been negotiated. One example of an AF 108 is the Proxy-Call Server Control Function (P-CSCF) of the IP Multimedia Core Network (IM CN) subsystem. The AF 108 may communicate with the PCRF node 105 to transfer dynamic session information (i.e. description of the media to be delivered in the transport layer). This communication is performed using the Rx interface.

The concept of a PDN (Packet Data Network) is defined by 3GPP. A PDN connection is an association (logical link) between a wireless device and a PDN. A PDN is in most cases an IP network, e.g. the Internet or an operator IP Multimedia Core Network Subsystem (IMS) service network. A PDN has one or more names, and each PDN name is defined by a string call the APN. The PDN is identified by the APN name and a PDN is accessed via a PGW. The PGW is a gateway towards one or more PDNs. The wireless device (UE) may have multiple PDN connections. The PDN may also be referred to as an external PDN. The setup of a PDN connection is initiated from the UE. Each PDN connection may have a single IP address or prefix or a pair of an IPv4 address and IPv6 prefix. Further, the APN as mentioned above is a parameter for identifying the PDN that a wireless communication device wants to communicate with. In addition to identifying a PDN, an APN may also be used to define the type of service that is provided by the PDN, for example a connection to a Wireless Application Protocol (WAP) server, a Multimedia Messaging Service (MMS) etc. APN is used in 3GPP data access networks, e.g. GPRS, Evolved Packet Core (EPC).

PDN connections, as mentioned above, may be setup over a 3GPP access (see, e.g. TS 23.401 (V.13.3.0), Sections 5.3.2 and 5.10.2) or may be setup over a non-3GPP access (see, e.g. TS 23.402 (V.13.2.0), Sections 7.2 and 16.2). A UE may have one or more PDN connections over 3GPP accesses and/or one or more PDN connections over non-3GPP accesses at the same time.

Every PDN connection consists of one or more bearers (as described, for example, in TS 23.401 (V.13.3.0), Section 4.7.2). In general, a bearer uniquely identifies traffic flows that receive a common QoS treatment between a UE and a PGW. Each bearer on a particular access has a unique bearer ID. The bearer IDs assigned for a specific UE on S2a/S2b (trusted/untrusted non-3GPP access, see above) are independent of the bearer IDs assigned for the same UE on the S5 interface (see FIG. 1) and may overlap in value.

On the 3GPP access, the corresponding bearer is an end-to-end bearer between the UE and the PGW (PDN gateway). The bearer ID is known by the PGW, the MME/SGSN, eNB and UE. On the non-3GPP access, there is currently no bearer concept between the UE and TWAG/ePDG. The bearer concept is only defined between the PGW and TWAG/ePDG, i.e. it is only defined one the S2a/S2b interfaces. In this case, the bearer ID is known by the PGW and TWAG/ePDG, but not by the UE. Depending of the radio access type (i.e. 3GPP access and non-3GPP access), the PCRF might not be aware of bearer IDs. Every PDN connection has at least one bearer, and this bearer is called the default bearer. Additional bearers on the PDN connection are called dedicated bearers.

Moreover, a bearer carries traffic in the form of IP packets. Which traffic is carried on a bearer is defined by IP filters. A filter is an IP n-tuple where each element in the tuple contains a value, a range or a wold card. Such an n-tuple is also known as an IP flow. An example of a 5-tuple is (dst IP=83.50.20.110, src IP=145.45.68.201, dot port=80, src port=*, port=TCP). This 5-tuple defines a source and destination IP address, a source and destination port, and a protocol. In the above example, the source port is a wildcard. Any traffic that matches this 5-tuple filter would be TCP traffic from IP=145.45.68.201 to 83.50.20.110 and port=80. Further, a traffic flow template, TFT, contains one or more IP filters. Every bearer has a TFT. One bearer within a PDN connection and access may lack an explicit TFT (this bearer is typically the default bearer). Implicitly, such a bearer has a TFT with a single filter matching all packets.

As explained above, UEs with multiple wireless interfaces, in particular UEs with a first interface for 3GPP access (first, cellular based radio access) and a second interface for non-3GPP access (second, non-cellular based radio access) are becoming commonly available and the set of applications running in the UEs is diversifying with some applications suited to run over 3GPP access systems and other applications suited to run over some other—complementary (non-3GPP)—access systems (e.g., ftp transfer via WLAN in parallel to VoIP over LTE). A general outline of such a multiple access scheme of the UE is shown in FIG. 4 that illustrates simultaneous 3GPP access and non-3GPP access to the PDN Gateway, an in which IP Flows 1, 2, and 4 (corresponding to respective applications) are routed over the non-3GPP access and IP Flows 3 and 5 (corresponding to respective applications) are routed over the 3GPP access.

There is ongoing work to study the scenarios, requirements and solutions for UEs with multiple interfaces which will simultaneously connect to a 3GPP access and potentially one, and only one, non-3GPP WLAN access. The scope of 3GPP Release-13 work as documented in 3GPP TR 23.861 (V.13.0.0), for example, is to identify the requirements and solutions for UEs with multiple interfaces which are simultaneously connected to a 3GPP access and a WLAN access using a network-based mobility protocol, PMIP and GPRS Tunneling Protocol (GTP) based on S2a and S2b access to the EPC architecture.

A IP flow mobility (IFOM) PDN connection is a special PDN connection that still has a single IP address/prefix (or a pair of IPv4 and IPv6 addresses/prefixes) but is routed over multiple accesses simultaneously. In the illustrative example of FIG. 4, the IP Flows 2 and 3 correspond to the same application and use a IFOM PDN connection. Here, the UE and the PGW (PDN Gateway) perform a negotiation process to decide which IP flows get routed over which access. In order to negotiate which IP flows shall be routed over which access, routing rule update procedures are being defined. Such a routing rule updates that specify the preferred access type to be used may be initiated either from the UE or from the PGW.

For network-based or network-initiated IP flow mobility (NBIFOM) procedures, the routing Rules (or corresponding routing decisions, PCC rules with routing decisions, i.e. the selected access) are determined via operator-configured policies in the PCRF, are then provided to the PGW, and are subsequently provided using an NBIFOM signalling to the UE. Here, the UE may accept or reject the IP flow mobility request depending on the current radio condition.

It has further been proposed to enhance existing PCC rules to control routing from the PCRF. In 3GPP TR 23.861 (V.13.0.0) the current proposal is that the Routing Rules contain: a Routing Filter (i.e. a description of the IP traffic covered by the Routing Rule), a Routing Access Type (i.e. the access type to be used for this traffic (e.g., WLAN)), and a Routing Rule Priority (i.e. a relative priority of the routing rule that is used in case multiple routing rules overlap). An example of implementing PCRF-initiated routing policies is illustrated in FIG. 5. In particular, FIG. 5 shows a procedure in which the PCRF, based on a policy decision, provides information of the service IP filters and the associated access type (AT) that shall be used for this traffic (WLAN, in this case) to the PGW (PDN Gateway). Subsequently, the PGW (PDN Gateway) acknowledges reception of the updated PCC rules to the PCRF and maps this information into routing rules (i.e. implements a bearer binding PCC rule to a suitable bearer in WLAN access) that are forwarded to the UE (in a routing rule update message including IP filters and the AT). Accordingly, the UE shall route the service traffic through WLAN, if possible.

WO 20141169933 A1 describes the User Equipment-Aggregated Maximum Bit Rate (UE-AMBR) as a QoS parameter that represents the aggregated maximum bit rate that may be assigned to a wireless device, such as the User Equipment (UE). The UE-AMBR is per wireless device (UE), where the wireless device has a SIM card with an International Mobile Subscriber Identity (SIM). The SIM card may be moved from one wireless device to another, so that the UE-AMBR is associated with the subscriber subscription. Moreover, the maximum bit rate consumed by a plurality or all the PDN connections established by a wireless device cannot surpass the UE-AMBR assigned to the wireless device. The UE-AMBR is a QoS parameter out of control for the PCRF and is defined in the wireless device subscription as stored in a Home Subscriber Server (HSS) or a Home Location Register (HLR), as for example shown in FIG. 5. The HSS is for the third Generation Partnership Project (3GPP) and similar to the HLR which is for a Global System for Mobile Communications (GSM) system.

As another QoS parameter described in WO 2014/169933 A1, the Access Point Name-Aggregated Maximum Bitrate (APN-AMBR) is the aggregated maximum bit rate that may be assigned per Access Point Name (APN) for a wireless device/user. That is, the sum of the maximum bit rate of all the PDN connections established by a UE towards a certain APN cannot surpass the value defined in the APN-AMBR. This QoS parameter is statistically defined in a wireless device subscription stored in the HSS or HLR, but may be dynamical changed by the PCRF node.

Further, the MME/SGSN sends the "used UE-AMBR" to eNB/RNC/BSC. The used UE-AMBR is the sum of all APN-AMBRs for different PDN connections restricted to the "subscribed UE-AMBR" parameter that the MME/SGSN received from the HSS/HLR at session establishment.

Further, WO 2014/169933 A1 describes a negotiation between the SGSN/MME and the PCRF for the User Equipment-Aggregated Maximum Bit Rate (UE-AMBR). In particular, an additional interface is defined between the MME/S4-SGSN and the PCRF, by means of which the MME/SGSN initiates, upon IP-CAN session establishment, a communication towards the PCRF with the purpose to negotiate the UE-AMBR. The PCRF node decides the UE-AMBR, based on policies and considering the user subscription information and the on-going sessions of the same user. In particular, the PCRF may consider the APN-AMBR values assigned in the user active PDN connections to calculate the UE-AMBR, and also conversely to assign a correct APN-AMBR value to a PDN connection by considering the UE-AMBR.

The MME/S4-SGSN further provides the UE-AMBR obtained from the HSS to the PCRF. The PCRF may decide a different UE-AMBR or may accept the received UE-AMBR. Further, the MME/S4-SGSN shall overwrite the UE-AMBR by the one obtained from the PCRF.

Problems with Existing Solutions

As has been described above in the background section, the operators may establish per subscription a maximum bit rate per UE, i.e. the aggregated maximum bit rate shall not surpass a bit rate limit that is established in the user subscription. For example, a user may have a subscription that provides 1 Mbps for each of the access sessions (UE-AMBR=number of sessions×1 Mbps), up to 1 Gb per month. Operators normally use this maximum UE-AMBR as a way to limit the consumption of resources per subscriber, to avoid congestion in the network, and/or also as a means to provide for subscriber differentiation.

Here, FIG. 6 illustrates the prior art situation (as taken from FIG. 2 in WO 2014/169933 A1) for the UE-AMBR versus the APN-AMBR in a communications network based on LTE. The UE-AMBR limits the maximum bit rate on non-Guaranteed Bit Rate (GBR) traffic for a wireless device. The globe in FIG. 6 represents a PDN network, e.g. the Internet. According to a first step in FIG. 6, the MME/SGSN receives the subscribed UE-AMBR and/or subscribed APN-AMBR from the HSS/HLR. The MME/SGSN is the network node which is informed of and may influence the UE-AMBR. In a second step in FIG. 6, the MME/SGSN sends the subscribed APN-AMBR for a PDN-connection to the GW1 node. In a third step, the GW1 node, in turn, forwards this to the PCRF node. The PCRF node may change the APN-AMBR to a value that is different from the subscribed APN-AMBR for a PDN-connection. The APN-AMBR value for a PDN-connection decided by the PCRF node is referred to as authorized APN-AMBR. The PCRF node sends the authorized APN-AMBR to the GW node for enforcement. The GW1 node forwards the authorized APN-AMBR to the MME/SGSN once authorized by the PCRF node, i.e. after step 3.

In a fourth step, the MME/SGSN determines and sends the "used UE-AMBR" to the eNB/RNC/BSC which constitutes the sum of the authorized APN-AMBR for all active PDN connections for one wireless device, referred to as APN-AMBR in FIG. 6. Note that the UE-AMBR is enforced in the eNB/RNC/BSC and the APN-AMBR is enforced in the GW. Even though the HSS/HLR and the PCRF have all the APN AMBR values of all the APNs, only one value is downloaded to the MME/SGSN and the GW per session. The eNodeB/RNC/RAN node is the enforcing unit, while the MME/SGSN only computes the used UE-AMBR and sends this to the eNodeB/RNC/RAN node.

As such, the limit of the UE-AMBR consumed in all PDN connections established by the UE is currently enforced in the ENodeB/RNC. This is a technical limitation since this solution is only valid for traffic being sent through 3GPP accesses. There is currently no solution for non-3GPP accesses such as Wi-Fi. This means that for IP-CAN sessions established through non-3GPP accesses there is no mechanism to control the UE aggregated maximum bit rate over multiple different/complementary accesses, i.e. 3GPP access and non-3GPP access and/or the non-3GPP access itself.

Besides, by means of the IP flow mobility capabilities described above, different service flows of the same IP-CAN session may be sent through different accesses at the same time, for example, Wi-Fi and LTE or Wi-Fi with another 3GPP access. Since traffic through a Wi-Fi access does not come through an eNodeB, there is thus currently no possibility to control the maximum bit rate consumed by the UE if certain flows come through a non-3GPP access such as Wi-Fi. This means that operators cannot limit the maximum bit rate per UE when, for example, a Wi-Fi and a 3GPP access are used simultaneously by the UE. As discussed, WO 2014/169933 A1 does not provide a solution to the problems related to the multiple different/complementary accesses (in particular 3GPP and non-3GPP accesses) as it only focuses on the UE-AMBR of 3GPP accesses (cellular-based radio access).

SUMMARY

Accordingly, it is an object of the present invention to solve the above described problems. In particular, it is an object of the present invention to provide capabilities to control a maximum bit rate in a multi-access network environment.

Suitable method(s), a wireless device, node(s), a system and computer program(s) are defined in the independent claims. Advantageous embodiments are defined in the dependent claims.

In one embodiment, a method in a wireless device having a first radio access and a second radio access to a communications network, in particular an access node of a core network of said communications network, said first radio access being a cellular communication access and said second radio access being a non-cellular communication access, comprises the steps of receiving, via the first radio access or the second radio access, a Multi-Access User Equipment Aggregated Maximum Bit Rate, Multi-Access-UE-AMBR, value and/or a User Equipment Aggregated Maximum Bit Rate, UE-AMBR, value for the second radio access; and ensuring that a bit rate of traffic generated by the wireless device and/or received by the wireless device does not surpass said received Multi-Access-UE-AMBR and/or said UE-AMBR value for the second radio access.

In another embodiment, a method in a PCRF node for handling a User Equipment Aggregated Maximum Bit Rate, UE-AMBR, for a wireless device having a first radio access and a second radio access to a communications network, in particular an access node of a core network of said communications network, said first radio access being a cellular communication access and said second radio access being a non-cellular communication access, comprises the steps of receiving a subscribed UE-AMBR, the subscribed UE-AMBR being associated with a wireless device subscription of the wireless device; calculating a Multi-Access User Equipment Aggregated Maximum Bit Rate, Multi-Access-UE-AMBR, value and/or a UE-AMBR value for said second radio access of said wireless device based on said subscribed UE-AMBR; and transmitting said calculated Multi-Access-UE-AMBR value and/or said UE-AMBR value for the said second radio access of said wireless device.

In still another embodiment, a method in a PDN Gateway node being communicatively connected with a PCRF node and a wireless device having a first radio access and a second radio access to the PDN Gateway node, said first radio access being a cellular communication access and said second radio access being a non-cellular communication access, comprises the steps of receiving, from the wireless device via the first radio access or the second radio access, an indication whether the wireless device supports enforcing a Multi-Access User Equipment Aggregated Maximum Bit Rate, Multi-Access-UE-AMBR, value and/or a User Equipment Aggregated Maximum Bit Rate, UE-AMBR, value for the second radio access; forwarding, to the PCRF node, an indication that the wireless device supports said enforcing; receiving, from the PCRF node, a calculated Multi-Access-UE-AMBR value and/or a calculated UE-AMBR value for the second radio access; and forwarding, to the wireless device via the first radio access or the second radio access, said calculated Multi-Access-UE-AMBR value and/or said calculated UE-AMBR, value for the second radio access.

In still further embodiments, a corresponding wireless device, a PCRF node, a PDN Gateway, and a system thereof is provided. In still another embodiment, respective computer programs are provided which includes instructions configured, when executed on a single or a plurality of data processors, to cause the single or the plurality of data processors to carry out the above-described methods.

Accordingly, based on the multi-access control of the maximum bit rates, the proposed solution could evolve towards a more access symmetric solution where 3GPP and non-3GPP accesses may be chosen and services/applications may be steered towards the most appropriate access depending on the network situation and service characteristics.

Moreover, the proposed solution enables the operator to limit the maximum bit rate per wireless device (UE) used in non-3GPP access connections. If further enables the operator to limit the maximum bit rate per UE in multi-access connections.

Further, the proposed solution provides operators with the capability for further subscriber differentiation, and thus provides means to save network costs by further limiting/controlling the usage of network resources per wireless device (UE). The application of the proposed solution thus protects from a bad use of network resources, and may further prevent abuses that consume a lot of network resources in a way that affects the rest of the users' connections.

BRIEF DESCRIPTION OF THE DRAWINGS

The embodiments herein will now be further described in more detail in the following detailed description by reference to the appended drawings illustrating the embodiments and in which:

FIG. 7 is a schematic flow diagram illustrating an embodiment of method at a wireless device.

DESCRIPTION OF THE EMBODIMENTS

Figure 1:
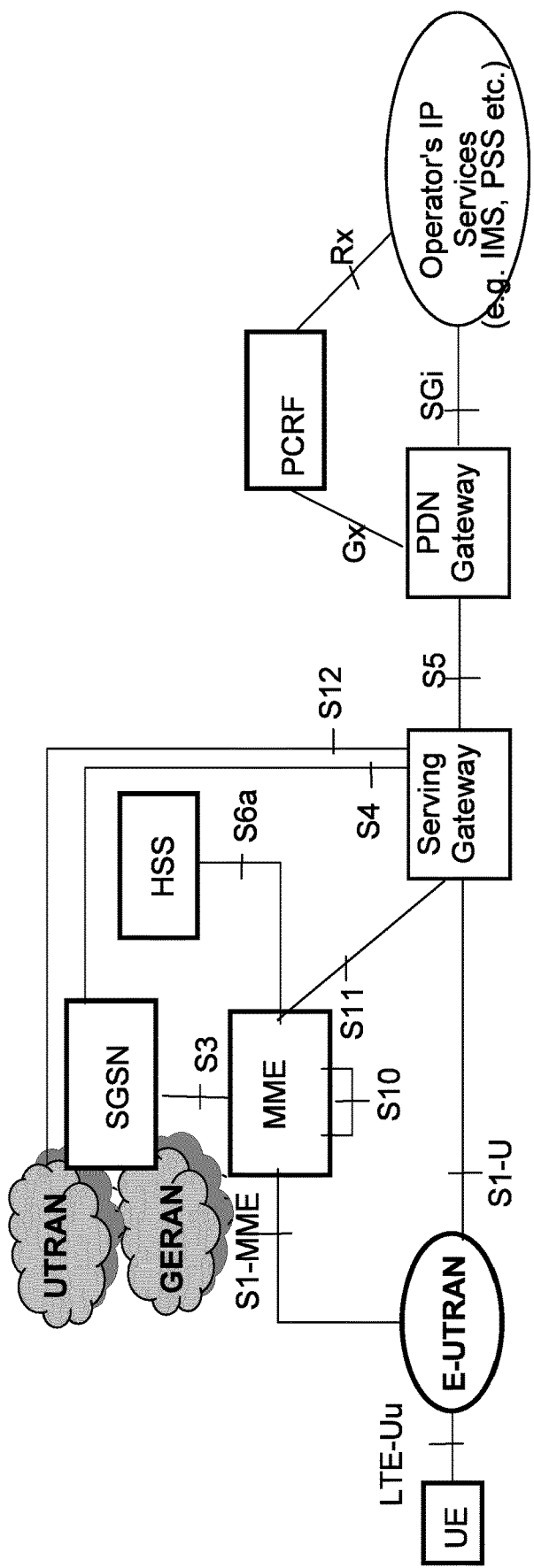
FIG. 1 is a schematic block diagram illustrating an Evolved Packet Core architecture in 3$^{rd}$ Generation Partnership Project (3GPP) with 3GPP access.
Figure 2:
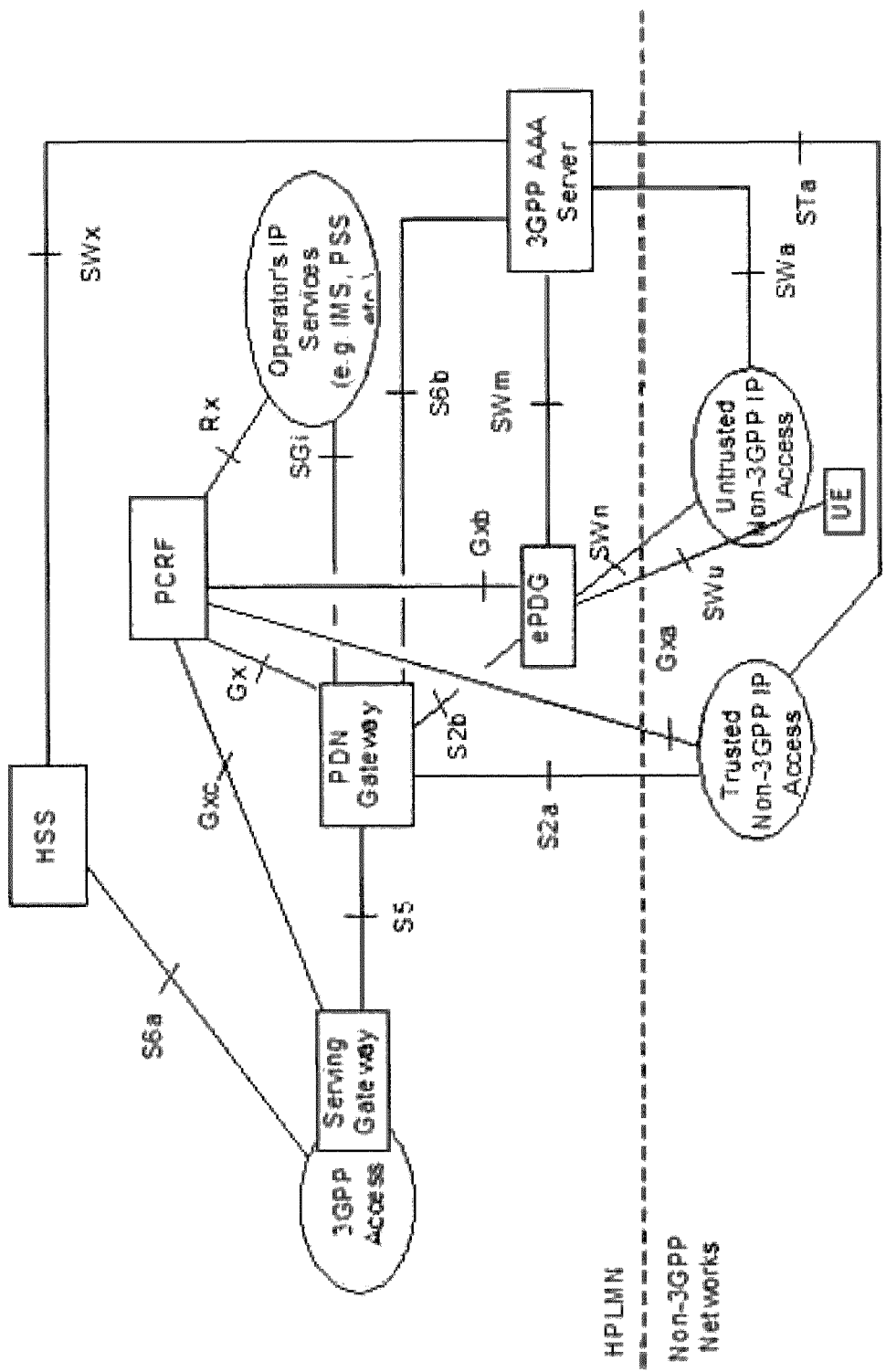
FIG. 2 is a schematic block diagram illustrating an Evolved Packet Core architecture in 3$^{rd}$ Generation Partnership Project (3GPP) with 3GPP access and non-3GPP access.
Figure 3:
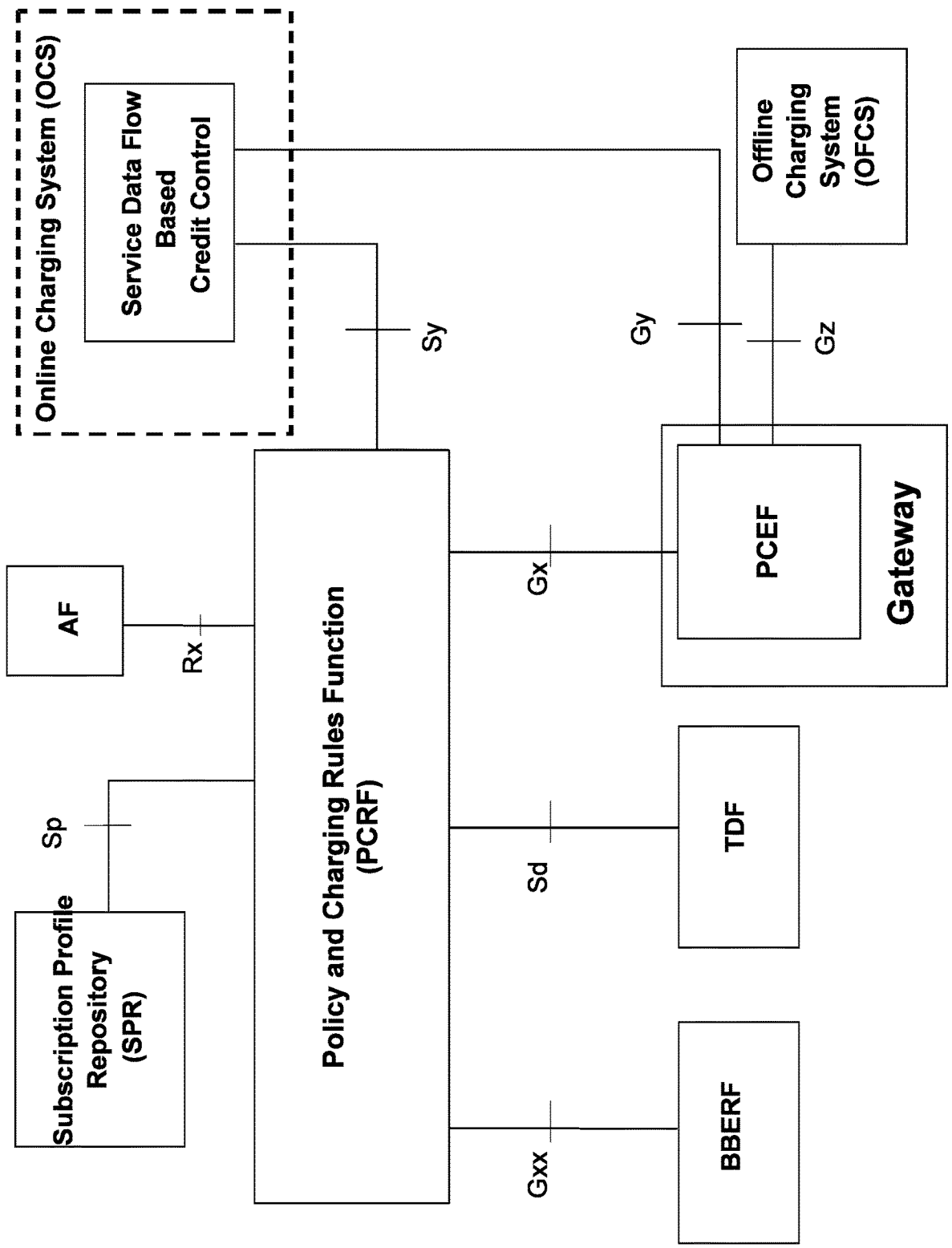
FIG. 3 is a schematic block diagram illustrating a Policy and Charging Control (PCC) Architecture in 3GPP.
Figure 4:
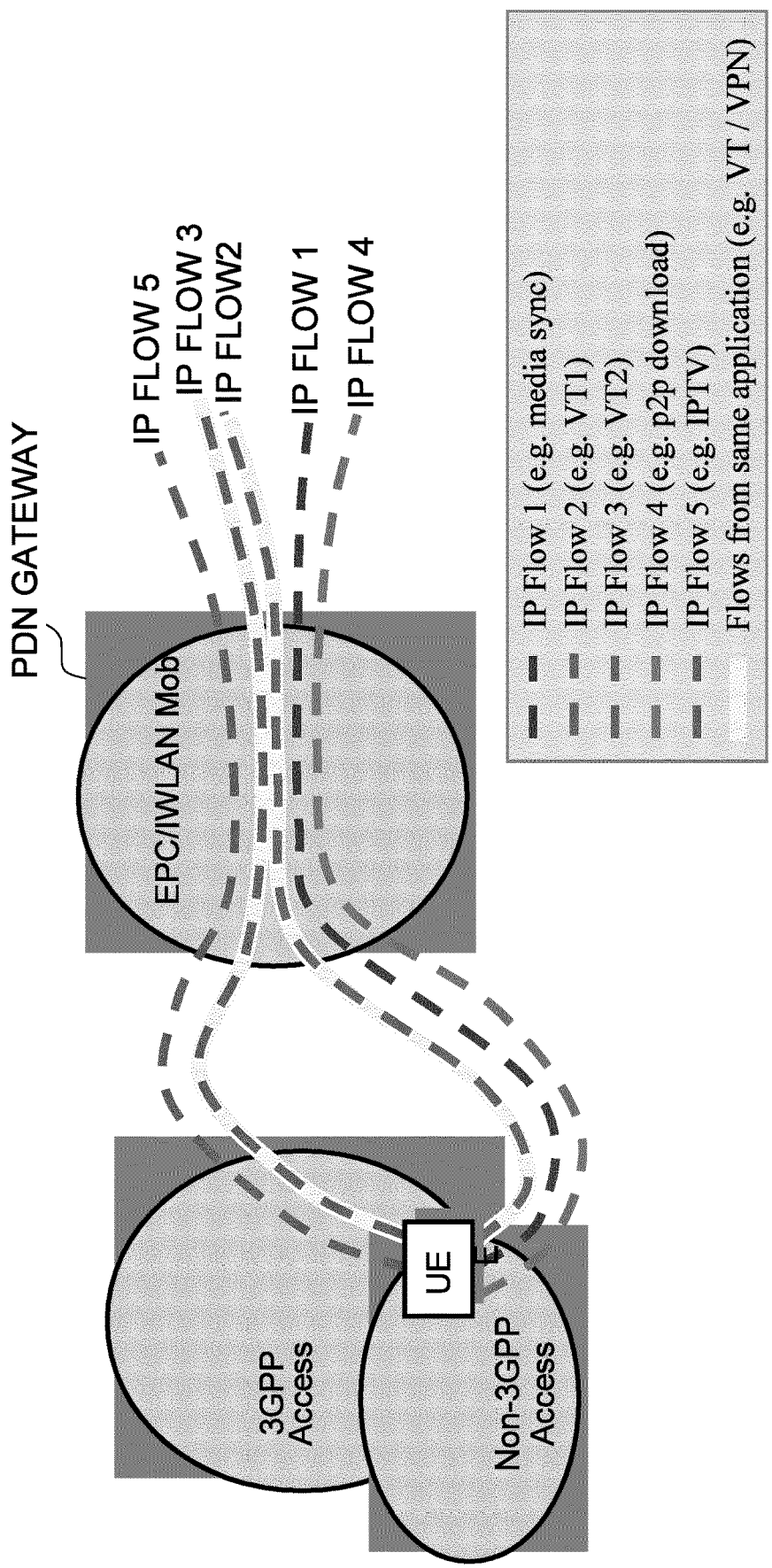
FIG. 4 is a schematic block diagram illustrating IP Flow Mobility via 3GPP access and non-3GPP access.
Figure 5:
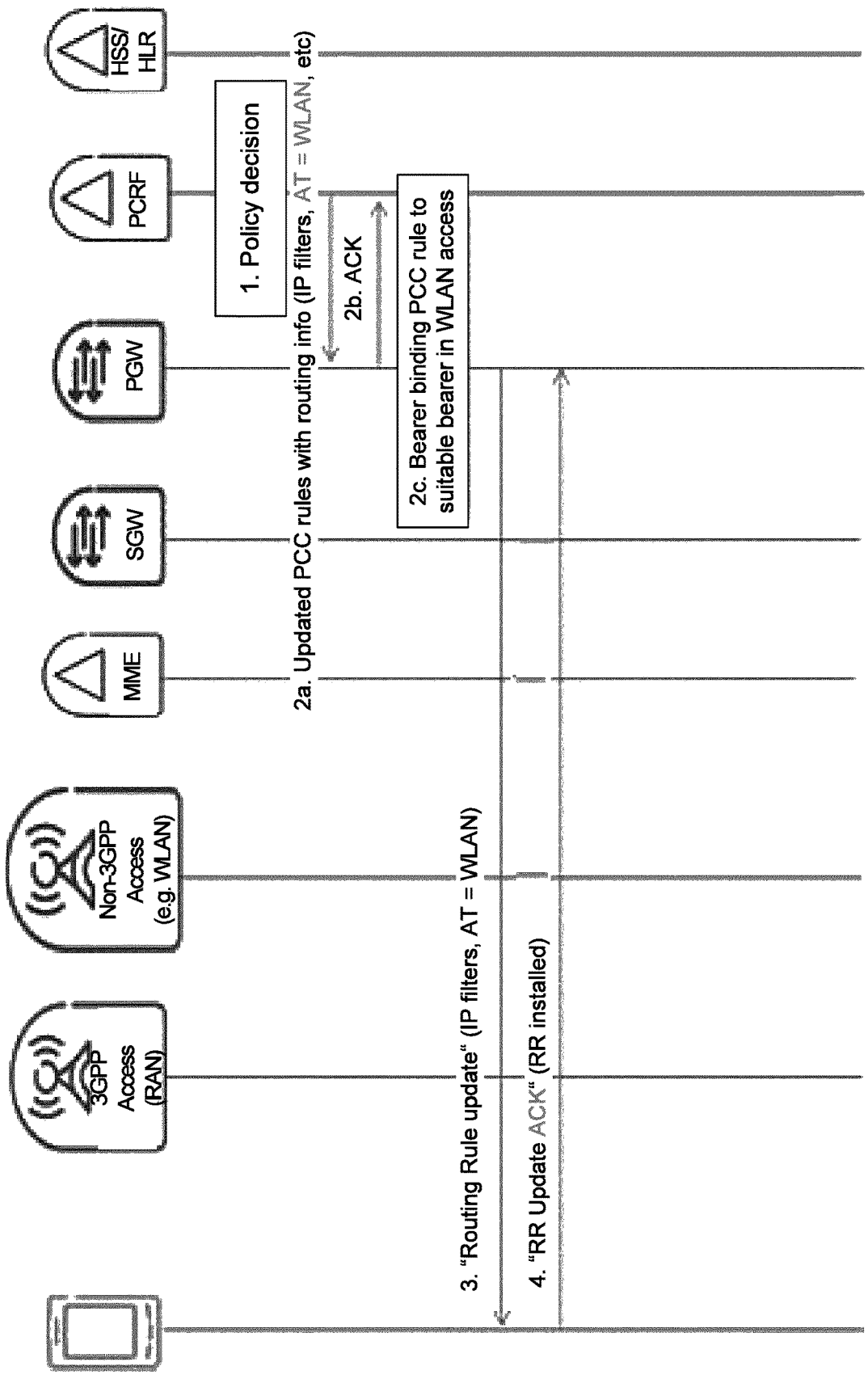
FIG. 5 is a schematic diagram illustrating the implementation of Policy Control and Charging Rules Function (PCRF) initiated routing policies.

In the following, embodiments are described with reference to the appended Figures. It is noted that the following description contains examples only and should not be construed as limiting the invention. A person skilled in the art will recognize additional features and advantages upon reading the following detailed description. Further, similar or same reference signs indicate similar or same elements or operations.

Based on the operators needs to control the aggregated maximum bit rate and considering that the current solution to control the aggregated bit rate only considers the traffic sent through 3GPP accesses, i.e. that the current solution does not take into account the traffic sent to or received by the UE trough non-3GPP access such as Wi-Fi, a solution is proposed below to apply a limitation regarding the maximum bit rate per UE for the total traffic exchanged through 3GPP access and also non-3GPP accesses.

In particular, two new elements are proposed, a Non-3GPP-Access-UE-AMBR that is the total maximum bit rate for all the traffic generated by the UE through (all) non-3GPP accesses (non-cellular based radio accesses), and a Multi-Access-UE-AMBR that is the total maximum bit rate for all the traffic generated by the UE across different accesses, comprising 3GPP and non-3GPP accesses. Here, the Multi-Access-UE-AMBR may be, as a maximum, the sum of the UE-AMBR stored in the HSS for 3GPP accesses plus the Non-3GPP-Access-UE-AMBR decided by the PCRF node. Here, the Non-3GPP-Access-UE-AMBR may be based on subscription and operator policies, and may in particular be based on: static criteria (e.g. based on the corresponding subscription profile), and/or dynamic criteria (e.g. taking into account the current traffic load experienced by certain access networks—either or both: 3GPP or non 3GPP access networks—, and/or traffic load experienced by nodes of the core network).

The Non-3GPP-Access-UE-AMBR values and the Multi-Access-UE-AMBR values, in particular respectively separated with regard to uplink (UL) traffic and downlink (DL) traffic, are preferable stored in the SPR subscription profile.

It is further proposed that the Non-3GPP-Access-UE-AMBR and/or the Multi-Access-UE-AMBR are enforced in the UE which is a common point where the aggregated maximum bit rate of the generated traffic through all type of accesses may be enforced in such multi-access scenarios.

It is further proposed to leverage the PCRF capabilities. In particular, the PCRF node may decide values for the Non-3GPP-Access-UE-AMBR and/or the Multi-Access-UE-AMBR. The PCRF node will determine/calculate these values based on the user subscription, the UE-AMBR stored in the HSS, and/or dynamic conditions and these values may be sent by the PCRF node to the PGW and will be further propagated to the UE through the access network. The UE may enforce the Non-3GPP-Access-UE-AMBR value and/or the Multi-Access-UE-AMBR value, as indicated by the PCRF node, and may assure that the bit rate of the traffic generated by the UE and received by the UE does not surpass the established limits.

The Multi-Access-UE-AMBR may be applied in the scenario of IFOM, where multiple accesses are used in a single PDN connection, and also in the scenario of multiple IP-CAN sessions through different accesses.

Figure 8A:
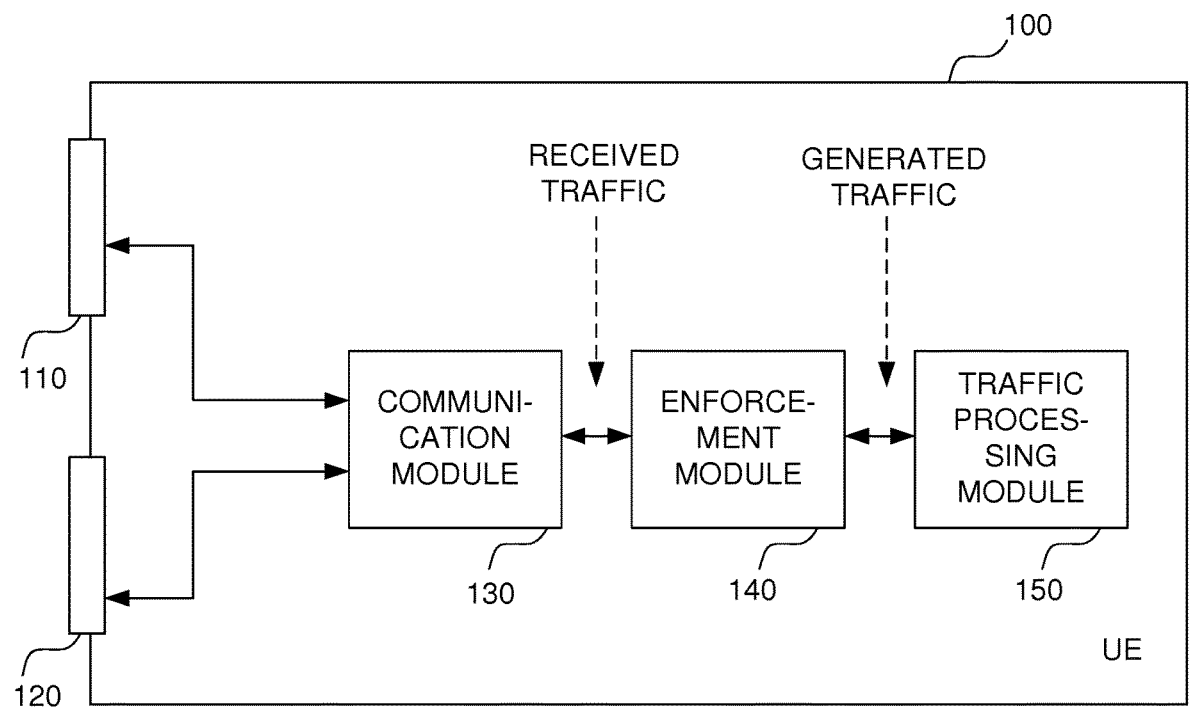
FIGS. 8A and 8B are schematic diagrams illustrating respective embodiments of a wireless device.

FIG. 7 illustrates a flow chart of an embodiment of a method in a wireless device (UE) having a first radio access and a second (different/complementary) radio access to a communications network, in particular an access node of a core network of said communications network. The access node may be the PDN gateway of the Evolved Packet Core. As described above, the PDN Gateway (PGW) is a gateway towards one or more PDNs. As further shown in FIG. 8A, the wireless device 100 may have a first interface 110 for the first radio access and a second interface 120 for the second radio access. Here, the first radio access is a cellular-based communication access and the second radio access is a non-cellular communication access when the UE 100 accesses the network through the two different accesses 110, 120 as part of the same PDN connection (IFOM) or in separate PDN connections. Further, the first cellular-based radio access may also be referred to as 3GPP access while the second non-cellular-based radio access may also be referred to as non-3GPP access.

According to step S110 shown in FIG. 7, the wireless device 100 may receive a Multi-Access User Equipment Aggregated Maximum Bit Rate, Multi-Access-UE-AMBR, value and/or a User Equipment Aggregated Maximum Bit Rate, UE-AMBR, value for the second radio access (also referred to as Non-3GPP-Access User Equipment Aggregated Maximum Bit Rate, Non-3GPP-UE-AMBR). As further shown in FIG. 8A, the respective values may be received by a communication module 130 via the first radio access (interface 110) or the second radio access (interface 120), and may be subsequently stored in a storage module (not shown) of the wireless device 100.

According to step S120 shown in FIG. 7, the wireless device 100 may further ensure that a bit rate of traffic generated by the wireless device 100 and/or received by the wireless device 100 does not surpass said received Multi-Access-UE-AMBR value and/or said UE-AMBR value for the second radio access. According to FIG. 8A, this enforcement of the UE-AMBR values received at the wireless device 100 may be implemented by an enforcement module 140 that may acquire information as to the amount of traffic that is received by the wireless device 100 by any of the multiple accesses and subsequently processed by a traffic processing module and/or as to the amount of traffic that is generated by a traffic processing module 150 or the like within the wireless device 100 and subsequently transmitted via any of the accesses. The information as to the received/transmitted traffic may be acquired by the wireless device 100 through a monitoring procedure (as will be described below).

As indicated above, the Multi-Access-UE-AMBR value and/or the UE-AMBR value for the second radio access may comprise a first value for uplink (UL) traffic and a second value for downlink (DL) traffic, respectively. More specifically, the received Multi-Access-UE-AMBR value may comprise an UL-Multi-Access-UE-AMBR value and a DL-Multi-Access-UE-AMBR value, while the UE-AMBR value for the second radio access may comprise a UL-UE-AMBR value for the second radio access and a DL-UE-AMBR value for the second radio access. Accordingly, the enforcement of the UE-AMBR values received at the wireless device 100 may be separately performed for uplink traffic and downlink traffic.

Figure 8B:
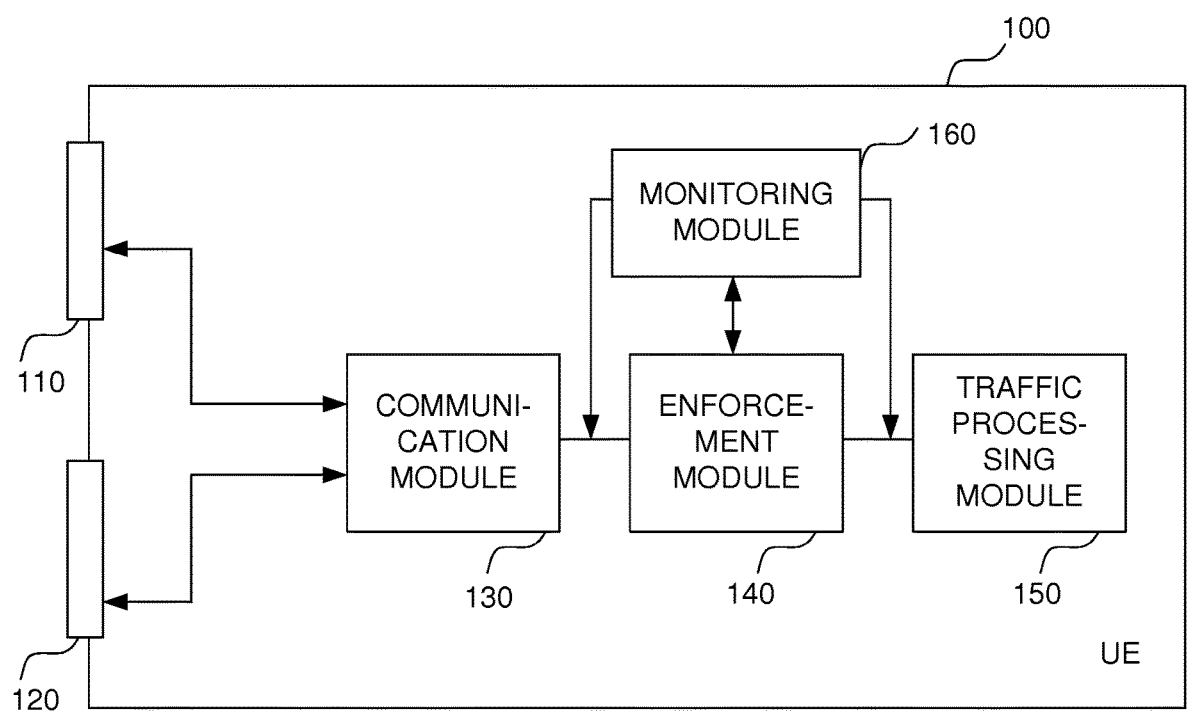
Figure 9:
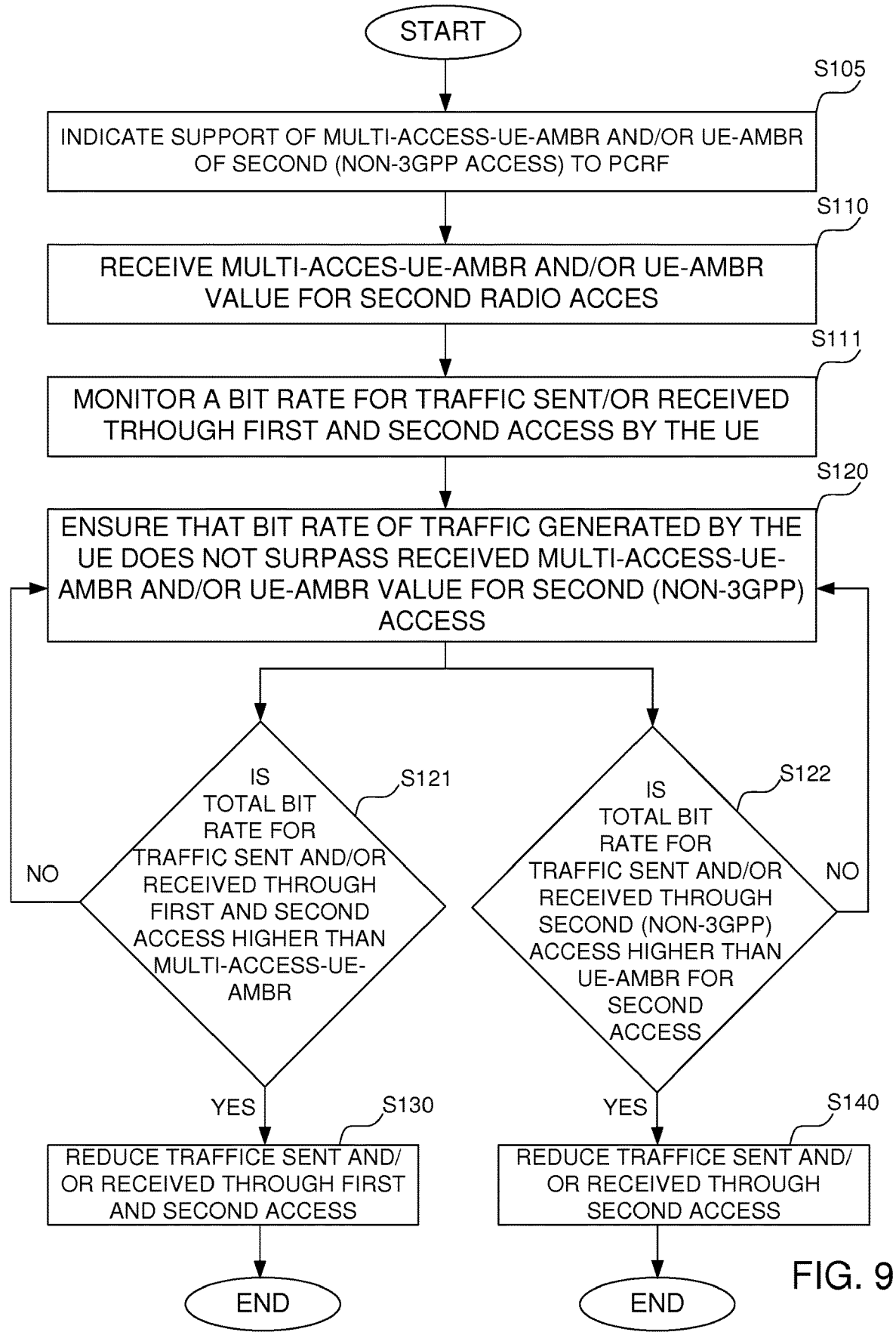
FIG. 9 is a schematic flow diagram illustrating an embodiment of method at a wireless device.

FIG. 9 illustrates a further embodiment of a method in a wireless device (UE) according to which the wireless device 100 may further indicate (S105) to the access node of a core network of said communications network, in particular the PDN Gateway 300 and the PCRF node 200, whether the wireless device supports the enforcement of the respective Multi-Access-UE-AMBR and/or the Non-3GPP-UE-AMBR values. For example, the wireless device 100 may use the communication module 130 shown in FIGS. 8A and 8B to indicating to the PCRF node 200 of the core network, via a PDN Gateway 300, whether the wireless device supports an enforcement of the Multi-Access-UE-AMBR value and/or the Non-3GPP-UE-AMBR value. As further described below, the indication may be provided by the UE as part of a Protocol-Configuration-Option (PCO) indicator provided during the attach procedure to the PDN Gateway 300.

In addition, the wireless device 100 may further monitor (S111) a bit rate for traffic sent and/or received through the respective access (first and/or second access) that are currently used by the wireless device. According to FIG. 8B, this may be implemented by a monitoring module 160 that may monitor the traffic that is received via the communication module 130 of the wireless device 100 and that may also monitor the traffic that is generated within the wireless device 100 (as exemplified by the traffic processing module 150) and transmitted from the wireless device 100. Here, the monitoring module 160 is preferably capable to distinguish in the monitoring between traffic over the first access (3GPP access) and traffic over the second access (non-3GPP access). For example, the wireless device (UE) may know what traffic is going to what access regardless of the routing rules (based on different interfaces).

According to FIG. 9, the wireless device 100 may further reduce (S130) a traffic rate sent and/or received through the first and second accesses of the wireless device 100, if it is determined in step S121 that a total bit rate for the traffic sent and/or received through said first and second accesses is higher than said received Multi-Access-UE-AMBR value.

In addition, the wireless device 100 may also reduce (S140) a traffic rate sent and/or received through the second access (non-3GPP access) of the wireless device 100, if it is determined in step S122 that a total bit rate for the traffic sent and/or received through the second access is higher than said received Non-3GPP-UE-AMBR value. This means that the user has still access (via the first and/or second radio access), but if the Multi-Access-UE-AMBR value and/or the UE-AMBR value for the second (non-3GPP) access is surpassed, then the wireless device 100 downgrades the QoS thereof.

In particular, if the wireless device 100 determines that the total monitored bit rate exceeds the Multi-Access-UE-AMBR value and/or the Non-3GPP-Access-UE-AMBR value, then the traffic is accordingly reduced, for example to a pre-determined lower bit rate. The reduction of the traffic may be maintained for a pre-determined time period. After the expiry of the pre-determined time period, the steps S111-S140 as described in FIG. 9 may again be executed by the wireless device 100 for the stored UE-AMBR value(s) or new/updated UE-AMBR value(s) may be received.

There is a variety of ways to determine the used total bit rate. In general, the monitoring module 160 in FIG. 8B may employ a bit rate meter to perform a bit rate measurement by counting how many bits are sent and/or received on a certain time interval (measured by a timer). For example, the UE 100 may have a counter that—on a per radio access interface type 110 and 120, and at least for the non-3GPP radio accesses (such as WiFi accesses)—counts the bits sent and received during a certain period of time (e.g. 1 second). In this example, the counter may be (re)started every second, and also every second a measure of the bit rate (expressed in bits per second) is produced by dividing the number of bits sent and/or received through the corresponding radio interface(s) during the 1 second period in question. This bit rate(s) may subsequently summed over a predetermined period of time to determine whether the aggregated bit rates (total bit rates) exceed the Multi-Access-UE-AMBR value (step S121) or exceed the Non-3GPP-UE-AMBR (step S122). In particular, if the monitoring module 160 determines in step S121 that the Multi-Access-UE-AMBR value is exceeded (YES), then the enforcement module 140 may accordingly reduce in step S130 the traffic sent and/or received through all accesses. On the other hand, if the monitoring module 160 determines in step S121 that the Multi-Access-UE-AMBR value is not exceeded (NO), then the monitoring is continued. Likewise, if the monitoring module 160 determines in step S122 that the Non-3GPP-UE-AMBR value is exceeded (YES), then the enforcement module 140 may accordingly reduce in step S140 the traffic sent and/or received through the second (non-3GPP) access. On the other hand, if the monitoring module 160 determines in step S122 that the Non-3GPP-UE-AMBR value is not exceeded (NO), then the monitoring is continued.

According to a further embodiment the wireless device 100 may be configured to have a single IP flow mobility (IFOM) PDN connection (as described above) being routed over the first radio access 110 and the second radio access 120, i.e. both the 3GPP and the non-3GPP access are used for the same IFOM PDN connection. As such, the Multi-Access-UE-AMBR value and the Non-3GPP-UE-AMBR value may be monitored and enforced for a single IFOM PDN connection. Alternatively, the wireless device 100 may be configured to have one PDN connection through the first radio access 110 and another PDN connection through the second radio access 120.

According to a further embodiment the wireless device 100 may be configured to initiating a routing rule update by re-negotiating IP flow routing over the first radio access and the second radio access when the bit rate of traffic generated by the wireless device and/or received by the wireless device does surpass the received Multi-Access-UE-AMBR value and/or said UE-AMBR value for the second radio access. For example, if the total bit rate for traffic over the second access exceeds the UE-AMBR value for the second access, but the total bit rate for traffic over the first and second access does not exceed the Multi-Access-UE-AMBR, then the re-negotiation of the IP flow routing switches traffic from the second (non-3GPP) access to the first (3GPP) access. Likewise, if the total bit rate for traffic over the first and second access exceeds the Multi-Access-UE-AMBR value, but the total bit rate for traffic over the second access does not exceed the UE-AMBR for the second access, then the re-negotiation of the IP flow routing attempts to switch traffic from the first (3GPP) access to the second (non-3GPP) access.

Figure 10:
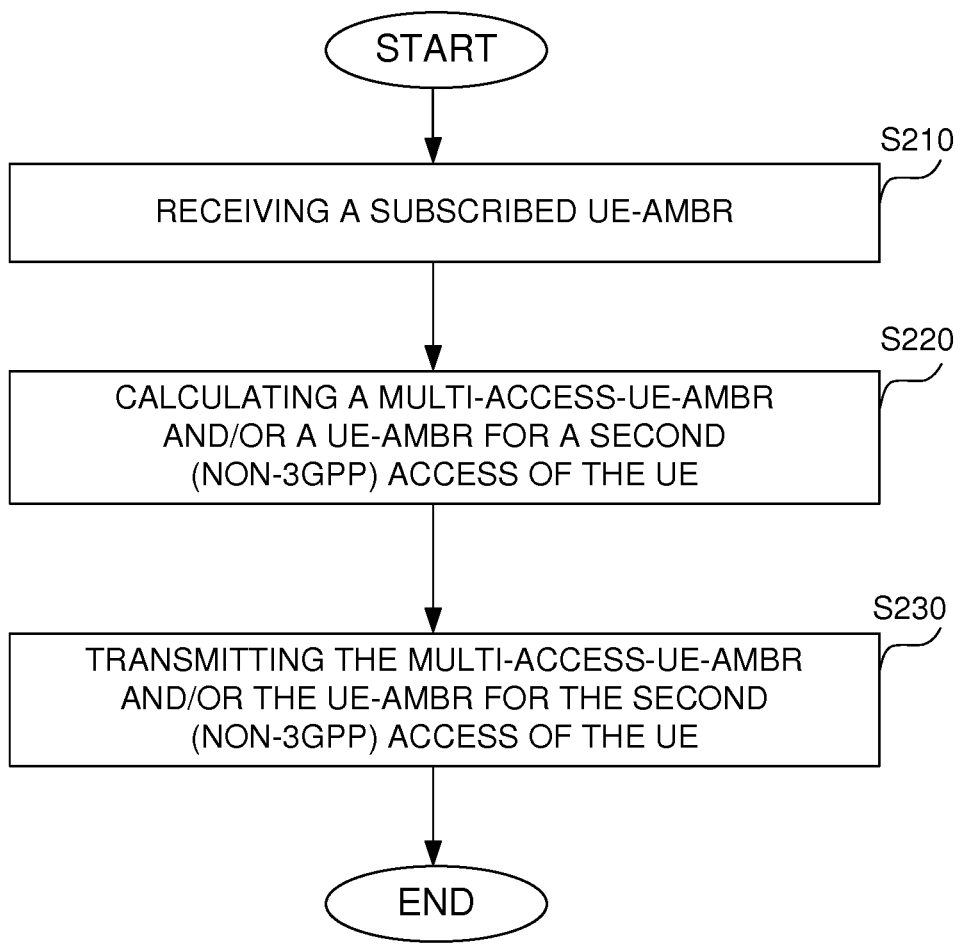
FIG. 10 is a schematic flow diagram illustrating an embodiment of method at a PCRF node.

FIG. 10 illustrates a flow chart of an embodiment of a method in a Policy and Charging Rules Function, PCRF, node 200 for handling a User Equipment Aggregated Maximum Bit Rate, UE-AMBR, for a wireless device (UE) 100 having a first radio access 110 and a second radio access 120 to a communications network, as described above, in particular to an access node of a core network of a communications network. Here, the PCRF node 200 may comprise a direct interface with a Mobility Management Entity/Serving General packet radio service Support Node (MME/SGSN), as described in WO 2014/169933 A1.

According to FIG. 10 the PCRF node 200 may receive in step S210 a subscribed User Equipment Aggregated Maximum Bit Rate, UE-AMBR. As further shown in FIG. 12A, the PCRF node 200 may accordingly be provided with a communication module 210 to receive the subscribed UE-AMBR, for example from the MME/SGSN using the direct interface described above. As further described above, the subscribed UE-AMBR may be associated with a wireless device subscription.

According to FIG. 10 the PCRF node 200 may further calculate in step S220 a Multi-Access User Equipment Aggregated Maximum Bit Rate, Multi-Access-UE-AMBR, and/or a UE-AMBR for said second radio access of said wireless device based on said subscribed UE-AMBR and preferably also based on policies and dynamic conditions associated with the wireless device 100.

The policies and dynamic conditions may comprise one or several conditions that may depend, for example, on at least one of subscriber category, time of day, other information received from the MME (such as the location), total amount of traffic consumed during previous sessions or concurrent current sessions, number of concurrent sessions, number of PDN connections, network information (e.g. roaming conditions).

Figure 12A:
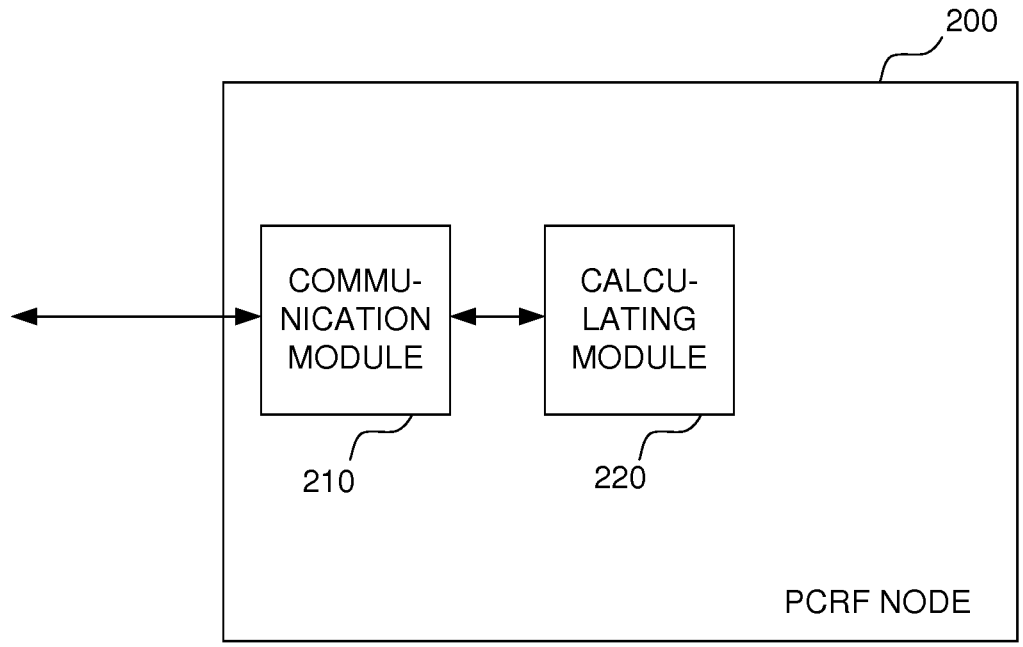
FIGS. 12A and 12B are schematic diagrams illustrating respective embodiments of a PCRF node.

According to FIG. 12A, this calculation step may be performed by a calculating module 220 of the PCRF node 200. More specifically, the Multi-Access-UE-AMBR value may be a sum of the subscribed UE-AMBR value, as stored in a Home Subscriber Server/Home Location Register node or as finally decided by the PCRF node 200 (if received from the MME and subsequently changed by the PCRF node 200), for the first radio access of said wireless device and received in step S210 (described above) and a UE-AMBR value for the second radio access of said wireless device which is decided by the PCRF node 200. In particular, the UE-AMBR value for the second radio access may be calculated based on a subscription value and operator conditions like: kind of access, time of the day, roaming conditions, location information, etc.

Here, the Multi-Access-UE-AMBR value and/or the UE-AMBR value for the second radio access may be determined by the calculating module 220 based on at least one of policies and subscription information received from a Subscriber Profile Repository, SPR, and information indicating an active Packet Data Network, PDN, connection associated with the wireless device 100, and a previous Multi-Access-UE-AMBR and/or Non-3GPP-UE-AMBR value determined for a previous PDN connection associated with the wireless device 100.

Subsequently, according to FIG. 10 the PCRF node 200 may further use the communication module 210 to transmit in step S230 the calculated Multi-Access-UE-AMBR and/or the calculated UE-AMBR for the second radio access of said wireless device 100. Accordingly, the calculated UE-AMBR values may be transmitted to wireless device 100 through the access network, in particular via the PGW Gateway as described below, and the calculated UE-AMBR values may be received at the wireless device 100 through any of the first and second radio accesses. More specifically, the calculated Multi-Access-UE-AMBR value and/or the calculated UE-AMBR value for the second (non-3GPP) access may be included in the transmission as part of a PCO indicator when the wireless device 100 establishes a PDN connection through the first radio access of the wireless device, where the PCO indicator is sent between the PGW gateway 300 and the wireless device 100 and may be part of a IP-CAN session establishment response message sent between the PCRF node 200 and the PGW gateway 300. The calculated Multi-Access-UE-AMBR value and/or the calculated UE-AMBR value for the second (non-3GPP) access may alternatively included as part of a PCO indicator when the wireless device 100 establishes a PDN connection through the second radio access being a trusted non-3GPP access (PCO sent between the PGW and the TWAG) or untrusted non-3GPP access (PCO sent between the PGW and the ePDG).

Figure 11:
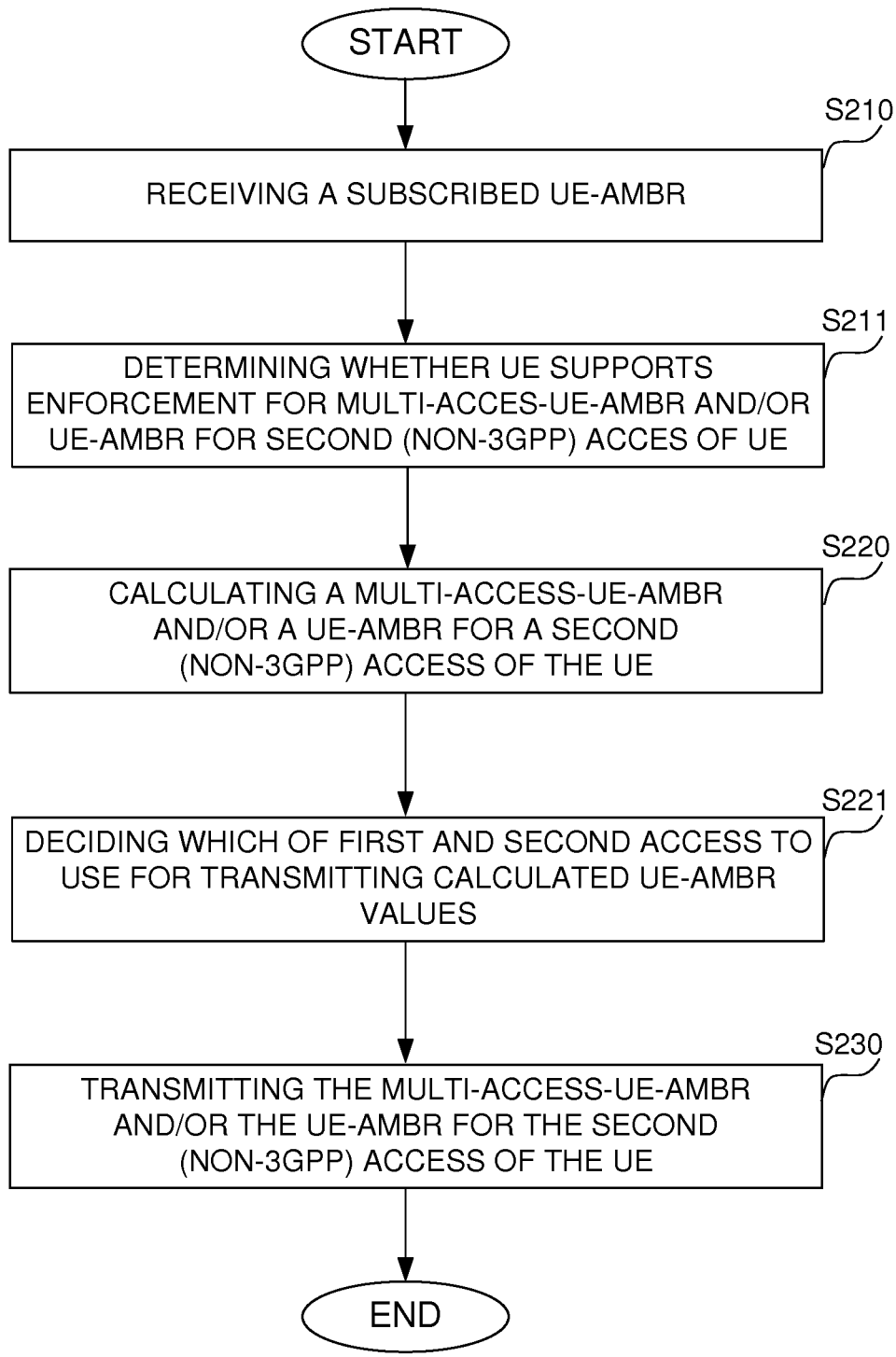
FIG. 11 is a schematic flow diagram illustrating an embodiment of method at a PCRF node.

FIG. 11 illustrates a flow chart of another embodiment of a method in a PCRF node 200. The following describes the additional steps as compared to the flow diagram of FIG. 10. In particular, according to the further step S211, the PCRF node 200 determines whether the wireless device 100 supports the enforcement of the Multi-Access-UE-AMBR value and/or the UE-AMBR value for the second radio access. In particular, an indication of such a support may be supplied by the wireless device 100 as part of a PCO provided by the wireless device 100 during the attach procedure, as described above. Such a PCO indication may accordingly be obtained by the PDN Gateway 300 (further described below) which subsequently includes an indication of this support in a IP-CAN session establishment message transmitted between the PDN Gateway node 300 and the PCRF node 200. A decision module 230, as shown in FIG. 12B, may accordingly determine whether a received IP-CAN session establishment message includes such an indication.

Figure 12B:
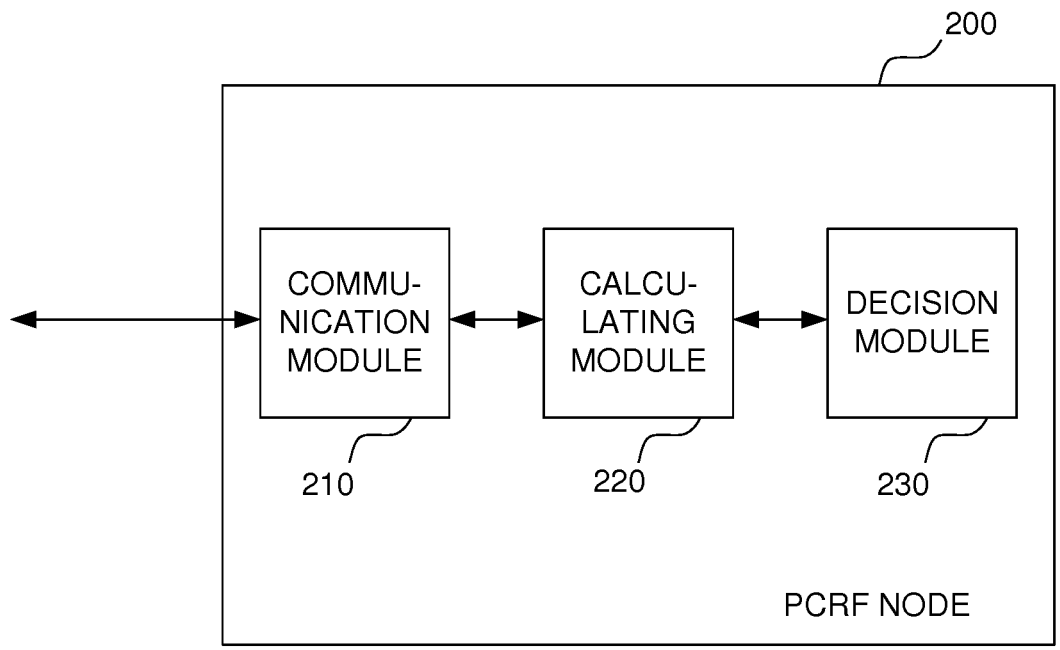

In addition, the PCRF node 200 may also use the decision module 230 shown in FIG. 12B to decide in step S221 of FIG. 11, whether the first or the second radio access of the wireless device 100 is to be use to send the calculated UE-AMBR values (calculated in step S220, as described above). This decision may be based on policies and/or capabilities of each access network, for example bases on a decision whether a used protocol is capable to transmit the calculated UE-AMBR values. It may thus be decided whether to transmit the Multi-Access-UE-AMBR value and/or the Non-3GPP-UE-AMBR value is transmitted over the 3GPP access or the Non-3GPP access.

According to another embodiment, the decision module 230 may also detect an event, for example detecting that a multi-access scenario is present (i.e. the UE has added and uses a second, non-3GPP radio access to the already present 3GPP access). Such an event may have an impact on calculation of the Multi-Access-UE-AMBR value and/or the Non-3GPP-UE-AMBR value. For example, based on the specific type of the non-3GPP radio access, the number of PDN connections, or the like, the calculating module 220 determines a specific Non-3GPP-UE-AMBR value which thus also influences the calculated Multi-Access-UE-AMBR value.

According to another embodiment, the decision module 230 may also determine whether the PCRF node 200 has previously transmitted the Multi-Access-UE-AMBR value and/or the UE-AMBR value for the second radio access, in particular for the current multi-access situation at the wireless device 100. In particular, if the Multi-Access-UE-AMBR value and/or the UE-AMBR value for the second radio access have already been transmitted for the current multi-access situation at the wireless device 100, then the respective UE-AMBR values are not transmitted again via the communication module 210.

Figure 13:
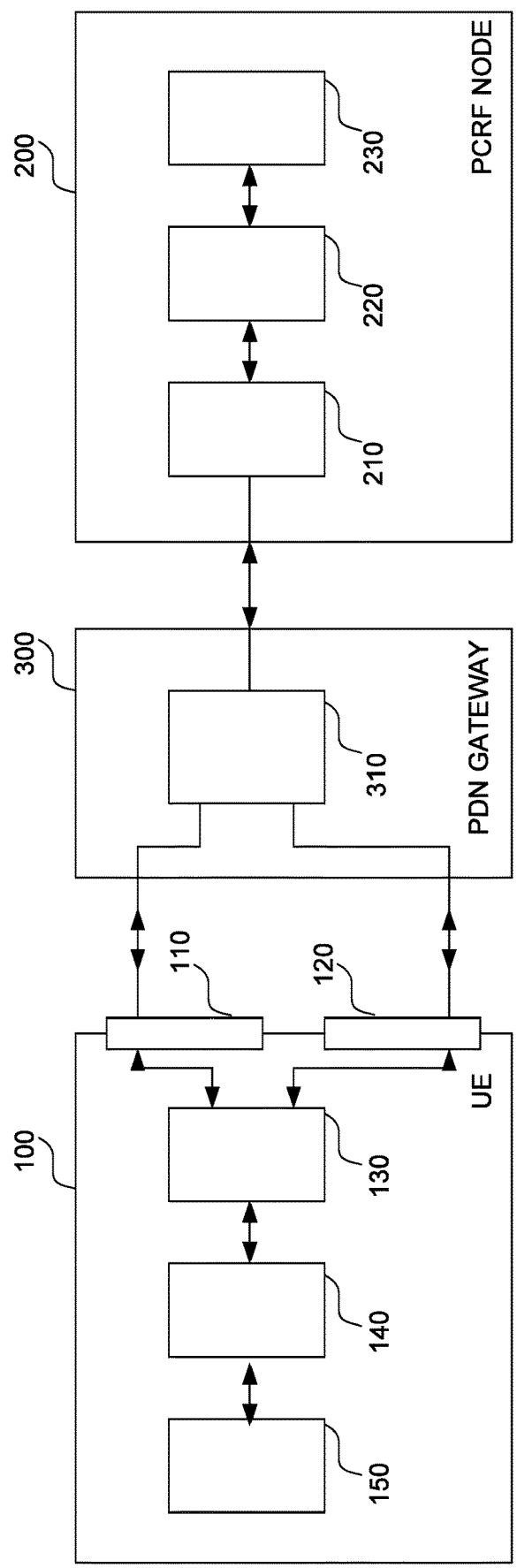
FIG. 13 is a schematic flow diagram illustrating an embodiment of a system comprising a wireless device, a PCRF node, and a PDN Gateway.

FIG. 13 illustrates a system comprising the PCRF node 200 and a PDN Gateway 300 which are communicatively connected within the communications network with the wireless device 100 as described above.

Here, the PDN Gateway 300 is shown to have a communications module 310 that may receive, from the wireless device 100 via the first radio access 110 or the second radio access 120, an indication whether the wireless device 100 supports enforcing the Multi-Access-UE-AMBR value and/or the UE-AMBR value for the second radio access. This indication may be provided, for example, based on a Protocol Configuration Option (PCO) indication transmitted from the wireless device to the communication module 310. Upon reception of such a PCO indication, the communication module 310 may accordingly forward to the PCRF node 200 an indication that the wireless device 100 supports the enforcing, as described above. For example, this indication may be forwarded as part of an IP-CAN session establishment message transmitted between the PDN Gateway 300 and the PCRF node 200.

Further, the communications module 310 may receive from the PCRF node 200 a calculated Multi-Access-UE-AMBR value and/or a calculated UE-AMBR value for the second radio access. These multi-access related UE-AMBR values may, for example, be included in an IP-CAN session establishment response message transmitted between the PCRF node 200 and the PDN Gateway 300. Upon reception, communications module 310 may subsequently transmit/ forward the calculated multi-access related UE-AMBR values to the wireless device 100, either via the first radio access or via the second radio access, for example as a PCO in a Create Session Response message or a Create/Update/Delete Bearer Request Message.

Figure 6:
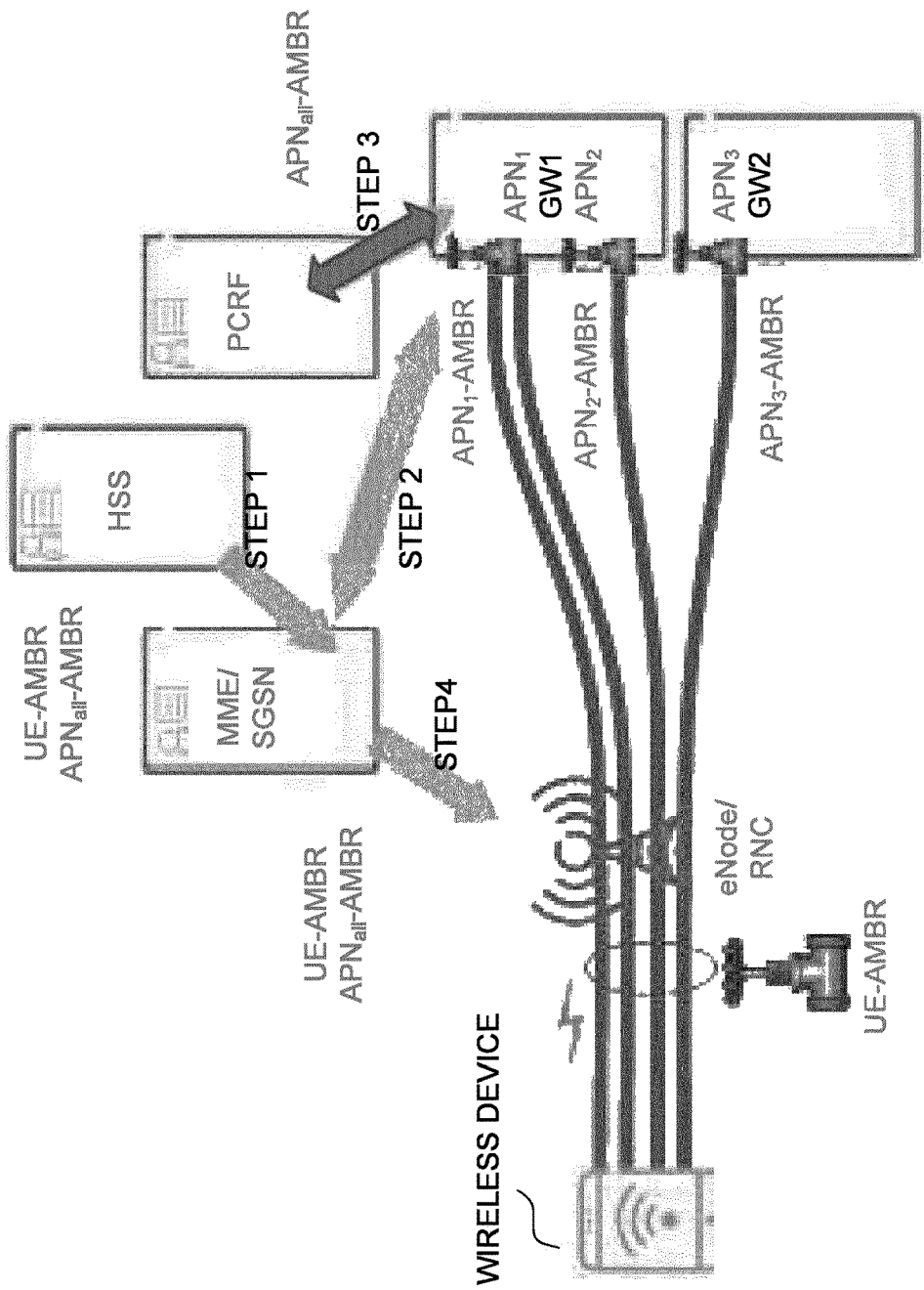
FIG. 6 is a schematic diagram illustrating UE-AMBR and APN-AMBR enforcement in the prior art.
Figure 14:
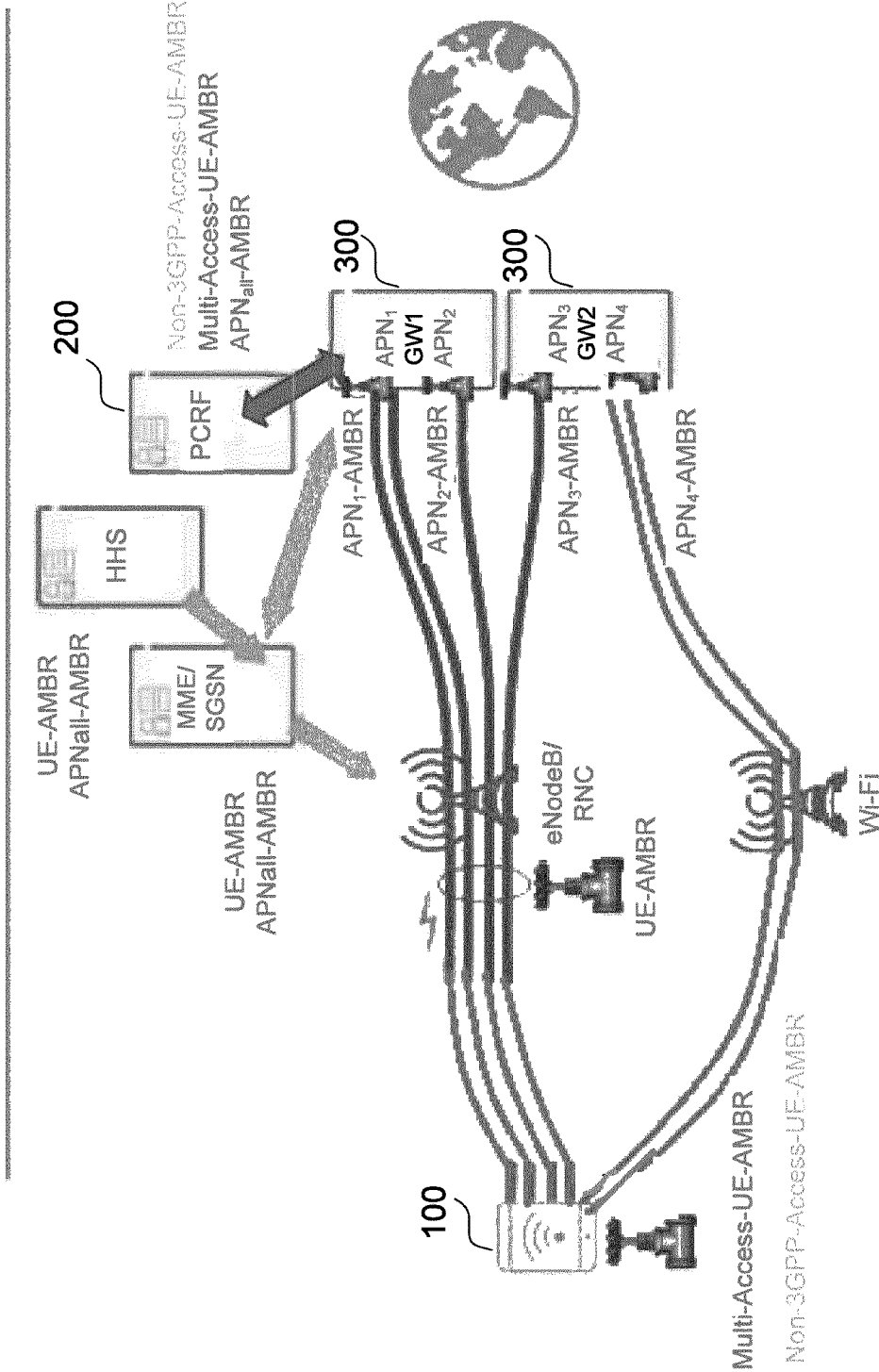
FIG. 14 is a schematic diagram illustrating an embodiment of Multi-Access-UE-AMBR and non-3GPP-Access-UE-AMBR enforcement.

FIG. 14 schematically illustrates an overview of the proposed concept of the Multi-Access-UE-AMBR and the Non-3GPP-Access-UE-AMBR as elaborated above. In comparison to the prior art approach as described in FIG. 6, the Multi-Access-UE-AMBR and the UE-AMBR for the second access (Non-3GPP-Access-UE-AMBR), in this example, a Wi-Fi access, is determined by the PCRF node 200, and subsequently transmitted via a PDN Gateway (GW1, GW2) to the wireless device 100 where the respective new Access-UE-AMBR values are being enforced.

It is further noted that the enforcement of the 3GPP UE-AMBR may be maintained in the eNodeB/RNC.

Figure 15:
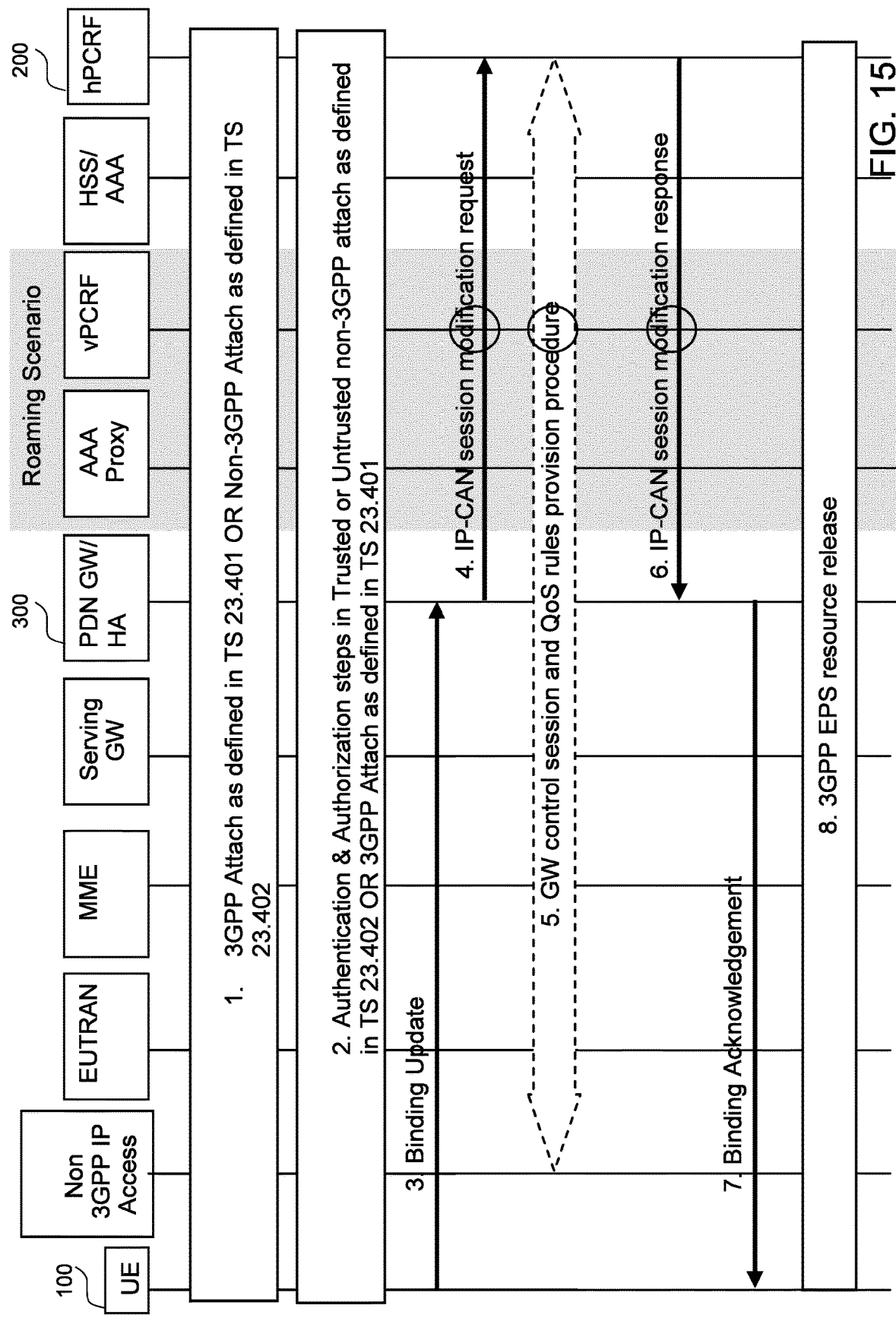
FIG. 15 is a signalling diagram illustrating an embodiment for implementing Multi-Access-UE-AMBR control in a wireless device initiated IP Flow mobility scenario.

FIG. 15 shows an embodiment of a Multi-Access-UE-AMBR policy control in UE initiated IP flow mobility. In this scenario, the wireless device/UE 100 is initially attached to one access. Subsequently, the UE 100 is authenticated in a second access and starts using both accesses for the same PDN connection. As a result, the UE 100 is simultaneously connected via both accesses and a set of traffic flows are routed through a first access while the remaining traffic flows are routed through the complementary, second access. In this scenario, the PCRF 200 (the roaming scenario, indicated here and below, between a visiting PCRF node (vPCRF) and a home PCRF (hPCRF) is not relevant) decides the Multi-Access-UE-AMBR value and this value is enforced in the UE 100 that will assure that the IP flow traffic generated will not surpass the bit rate as indicated by the Multi-Access-UE-AMBR value. In the present embodiment, it is not distinguished between trusted and non-trusted non-3GPP access. Different options for the trusted/non-trusted non-3GPP access are specified in 3GPP TR 23.861 (V.13.0.0) "Network based IP flow mobility".

The Multi-Access-UE-AMBR value may be provided via the PDN GW 300 to the UE 100 through any of the accesses, i.e. through either the 3GPP access or the non-3GPP access. The PCRF 200 will decide which access to use to send this information to the UE based on policies and/or capabilities of each access network. It is noted that in order to send this new information element, the protocols used in the respective different access networks may be extended, and therefore it might be that not all the access networks are prepared to convey this information.

For example, if the non-3GPP access network does not support sending this information, the PCRF node 200 will instead use the 3GPP access network in order to make this information available at the UE. In that case, the Multi-Access-UE-AMBR value may be provided to the UE 100 when the UE first connects to the 3GPP network, even though there is no second (non-3GPP access) yet.

It is further noted that non-3GPP accesses are out of scope of 3GPP and the support of functionality is not subject to 3GPP standards. When not supported by the non-3GPP network, it would not be possible to apply a UE-AMBR enforcement when the UE is connected to then non-3GPP network only.

More specifically, FIG. 15 illustrates steps 1-8 in the context of Multi-Access-UE-AMBR policy control in UE initiated IP flow mobility.

In step 1 of FIG. 15, the UE 100 performs an attach procedure to one of the accesses, i.e. the 3GPP access as defined in 3GPP TS 23.401 (V.13.3.0) or the non-3GPP access as defined in 3GPP TS 23.402 (V.13.2.0). The UE 100 may start exchanging data through either of that access. When the access is 3GPP, if the PCRF 200 deduces that in that operator network the non-3GPP network, according to its capabilities, does not support sending of Multi-Access-UE-AMBR, the PCRF 200 may derive the Multi-Access-UE-AMBR value at this step based on subscription information and policies and provide this information back to the UE 100 via the 3GPP access.

In step 2 of FIG. 15, the UE 100 discovers another access and adds a new access for the same PDN connection. In particular, authentication and authorization steps in trusted or untrusted non-3GPP Attach (as defined in TS 23.402) or 3GPP Attach (as defined in TS 23.401) are performed.

In step 3 of FIG. 15, the UE 100 sends a Binding Update message to the PDN GW 300 including the requested routing rules. The UE 100 may include more than one routing rule in the Binding Update message. The UE 100 also indicates in the Binding Update message the default binding to which the PDN GW 300 should route packets not matching any rule.

In step 4 of FIG. 15, the PDN GW 300 sends an IP-CAN session modification request to the PCRF 200. In this request, the PDN GW 300 provides the routing rules to the PCRF 200. The PCRF 200 stores the mapping between each SDF and its routing address. The PCRF 200 thus detects that this is a multi-access scenario in which a non-3GPP access leg has been added to the existing IP session. In this case, if the PCRF 200 has not provided the Multi-Access-UE-AMBR value in step 1 described above, it derives it in this step based on subscription information and policies and sends this value to the UE 100 via this non-3GPP access. If the value was already sent in step 1 (3GPP access), there is no need to send it via the non-3GPP access. It is noted that the PCRF node 200 knows/decides which access to use to send the information.

In step 5 of FIG. 15, based on the received IP-CAN session modification request, the PCRF 200 ensures that the relevant QoS rules for the SDFs are installed in the target BBERF (not shown in FIG. 15).

In step 6 of FIG. 15, based on the successful establishment of resources at the BBERF, the PCRF 200 sends an acknowledgement response to the PDN GW 300 which includes updated PCC rules if appropriate and the obtained Multi-Access-UE-AMBR value of step 4.

In step 7 of FIG. 15, the PDN GW 300 sends a Binding Acknowledgement to the UE 100 to indicate which routing rules requested by the UE 100 are accepted. In addition, the UE 100 enforces the Multi-Access-UE-AMBR.

In step 8 of FIG. 15, appropriate 3GPP/Non-3GPP resource release procedures are executed for those resources that were moved to the non-3GPP/3GPP access. This procedure may be triggered by the PCRF 200 via a GW control session and a QoS rules provision procedure, if PMIPv6 is used on s5 and it may be triggered by the PDN GW 300 in case GTP is used on s5.

Figure 16:
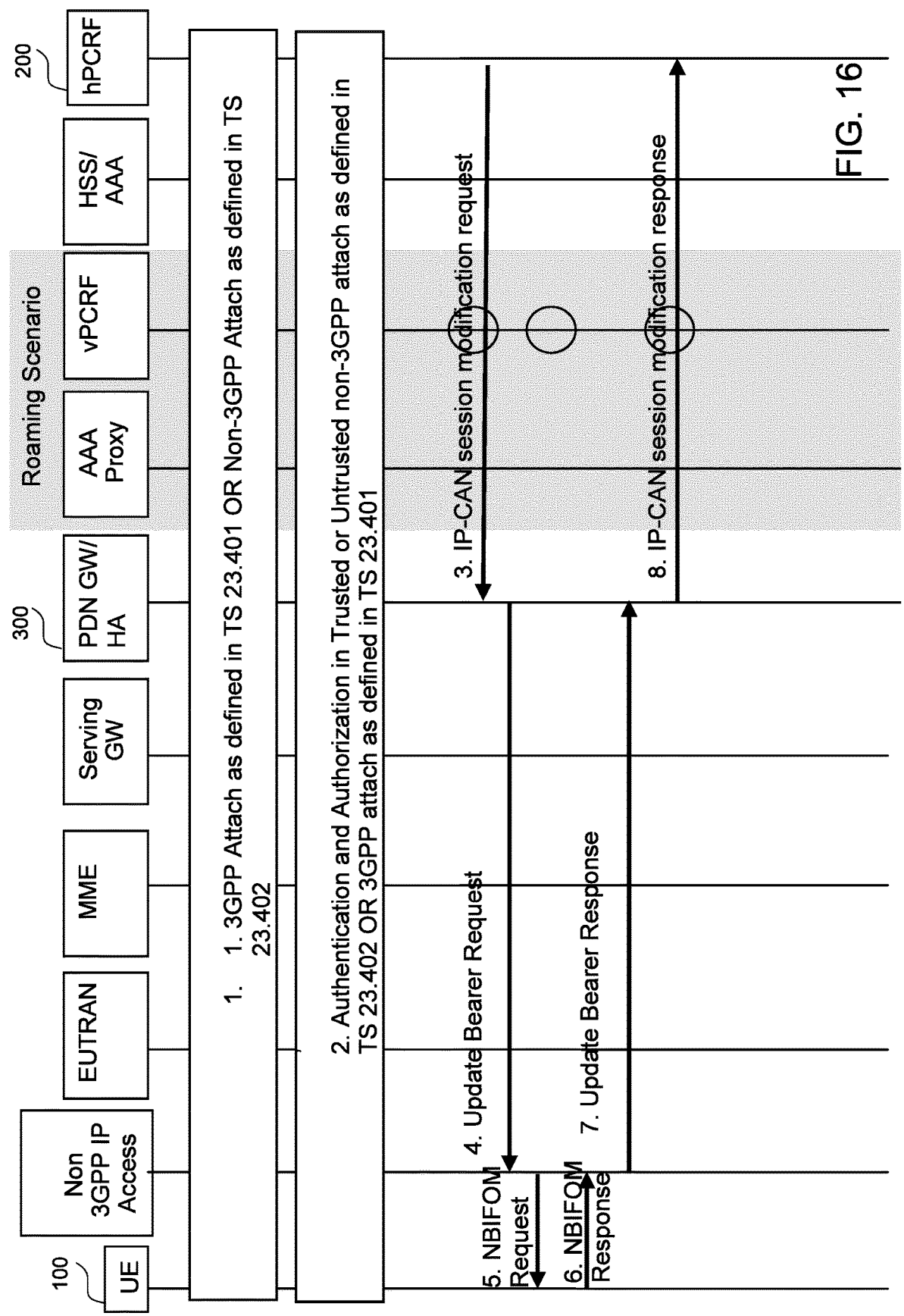
FIG. 16 is a signalling diagram illustrating an embodiment for implementing Multi-Access-UE-AMBR control in a network initiated IP Flow mobility scenario.

FIG. 16 shows an embodiment of a Multi-Access-UE-AMBR policy control in a network initiated IP flow mobility.

In this scenario, similar to the scenario in FIG. 15 described above, the UE 100 is initially attached to one access. Subsequently, the UE 100 is authenticated in a second access and starts using both accesses for the same PDN connection. As a result, the UE 100 is simultaneously connected via both accesses and a set of traffic flows are routed through a first access while the remaining traffic flows are routed through the other, second access. In this scenario, the PCRF 200 may decide about the routing rules, i.e. what flows shall be routed through different access types, and also about the Multi-Access-UE-AMBR value. The Multi-Access-UE-AMBR value is again enforced in the UE 100 that will assure that the IP flow traffic generated will not surpass the bit rate as indicated by the Multi-Access-UE-AMBR value.

More specifically, steps 1 and 2 of FIG. 16 correspond to the steps 1 and 2 described above with regard to FIG. 15.

In step 3 of FIG. 16, the PCRF 200 may provide PCC Rules with routing decisions to the PDN GW 300 during an IP-CAN modification procedure. The PCRF 200 thus detects that this is a multi-access scenario, where a non-3GPP access leg has been added to the existing IP session. In this case, if the PCRF 200 has not provided the Multi-Access-UE-AMBR value in step 1, it derives it based on policies and subscription information and sends this value together with the Routing Rules to the PDN GW 300.

In step 4 of FIG. 16, the PDN GW 300 decides to move one or more IP flows based on the received PCC Rules with routing information. The PDN GW 300 sends the Routing Rules and the Multi-Access-UE-AMBR value within a Create/Update/Delete Bearer Request to the Non-3GPP access.

In step 5 of FIG. 16, the Non-3GPP access sends a new NBIFOM request message to the UE 100, including the Routing Rules and the Multi-Access-UE-AMBR value. The UE 100 may decide to accept or reject the Routing Rules. The UE 100 applies the accepted Routing Rules and enforces the Multi-Access-UE-AMBR value. In addition, the UE 100 acknowledges the applied rules in a new NBIFOM response message to the Non-3GPP access in step 6 of FIG. 16.

In step 7 of FIG. 16, the Non-3GPP access sends a Create/Update/Delete Bearer response to the PDN GW.

In step 8 of FIG. 16, the PDN GW 300 indicates to the PCRF 200 whether the Routing Rules could be enforced or not. This corresponds to the completion of the PCEF-initiated IP-CAN session modification procedure as defined in TS 23.203 (V.12.0.0), proceeding after the completion of IP-CAN bearer signalling.

As such, appropriate 3GPP/Non-3GPP resource establishment/release/modification procedures are executed for the resources associated with the IP flows that were removed/added in the 3GPP/Non-3GPP access as described in TS 23.401.

The above illustrated embodiments according to FIGS. 15 and 16 have focused on IFOM cases in which a single PDN connection is established enabling multiple flows through different accesses. In the following, a scenario will be explained in which the UE 100 establishes multiple PDN connections through different accesses.

Figure 17:
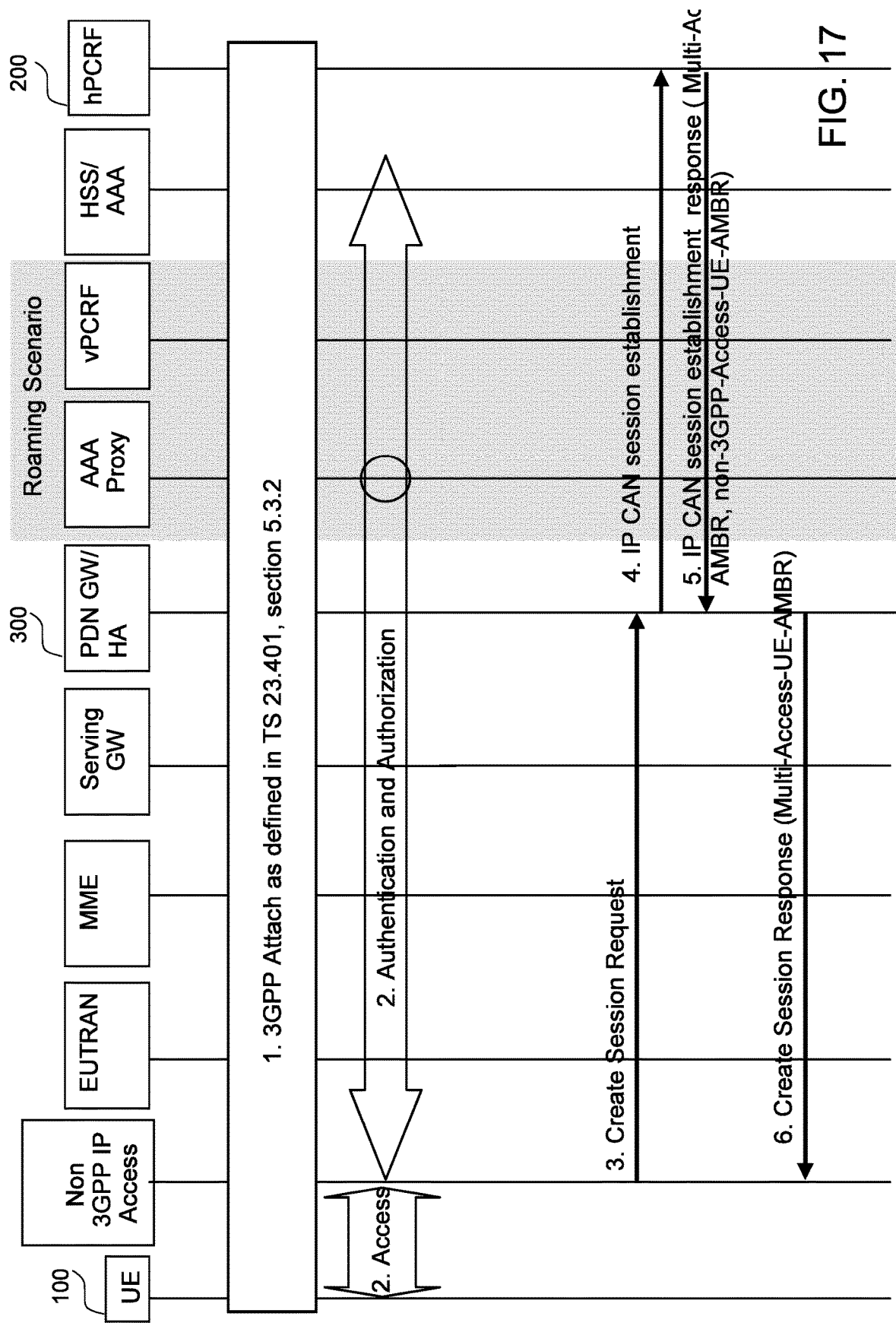
FIG. 17 is a signalling diagram illustrating an embodiment for implementing Multi-Access-UE-AMBR control in a multiple IP-CAN session establishment scenario.

FIG. 17 shows a flow diagram according to an embodiment for the establishment of two PDN connections, one through a 3GPP access and another through a non-3GPP access. Both connections may end in the same PCRF 200 or not. Upon establishment of the non-3GPP connection (e.g. a Wi-Fi connection), the PCRF 200 downloads the Multi-Access-UE-AMBR which is sent to the UE 100 where it is enforced.

According to step 1 of FIG. 17, the UE 100 establishes a PDN connection through the 3GPP access, for example as defined in TS 23.401 (Section 5.3.2). If the PCRF 200 deduces that in that operator network the non-3GPP network, according to its capabilities, does not support sending the Multi-Access-UE-AMBR, the PCRF 200 derives the Multi-Access-UE-AMBR at this step based on subscription information and/or policies and provides this information back to the UE via the 3GPP access network.

In step 2 of FIG. 17, the UE 100 attaches in a non-3GPP access, e.g. Wi-Fi, which includes a corresponding authentication and authorization of the UE in the attached network.

In step 3 of FIG. 17, a create session request is initiated between the non-3GPP access and the PDN GW 300.

In step 4 of FIG. 17, the PDN GW 300 sends an IP-CAN session establishment to the PCRF 200.

According to step 5 of FIG. 17, the PCRF 200 downloads policies to the PDN GW 300 in an IP-CAN session establishment response which may also include the Multi-Access-UE-AMBR, if the Multi-Access-UE-AMBR value is not already provided in step 1, and the Non-3GPP-Access-UE-AMBR.

In step 6 of FIG. 17, upon a create session response from the PDN GW 300 to the non-3GPP access, a PDN connection is established and the Multi-Access-UE-AMBR value (and/or the Non-3GPP-Access-UE-AMBR—not illustrated in the figure for simplicity—) is sent to the UE 100 where it is to be enforced.

The following embodiment illustrates the establishment of an IP-CAN session in a non-3GPP access and the enforcement of Non-3GPP-Access-UE-AMBR. This is a case of a non-3GPP access network that supports sending UE-AMBR related information. More specifically, FIG. 18 shows a flow diagram according to an embodiment according to the enforcement of Non-3GPP-Access-UE-AMBR.

Figure 18:
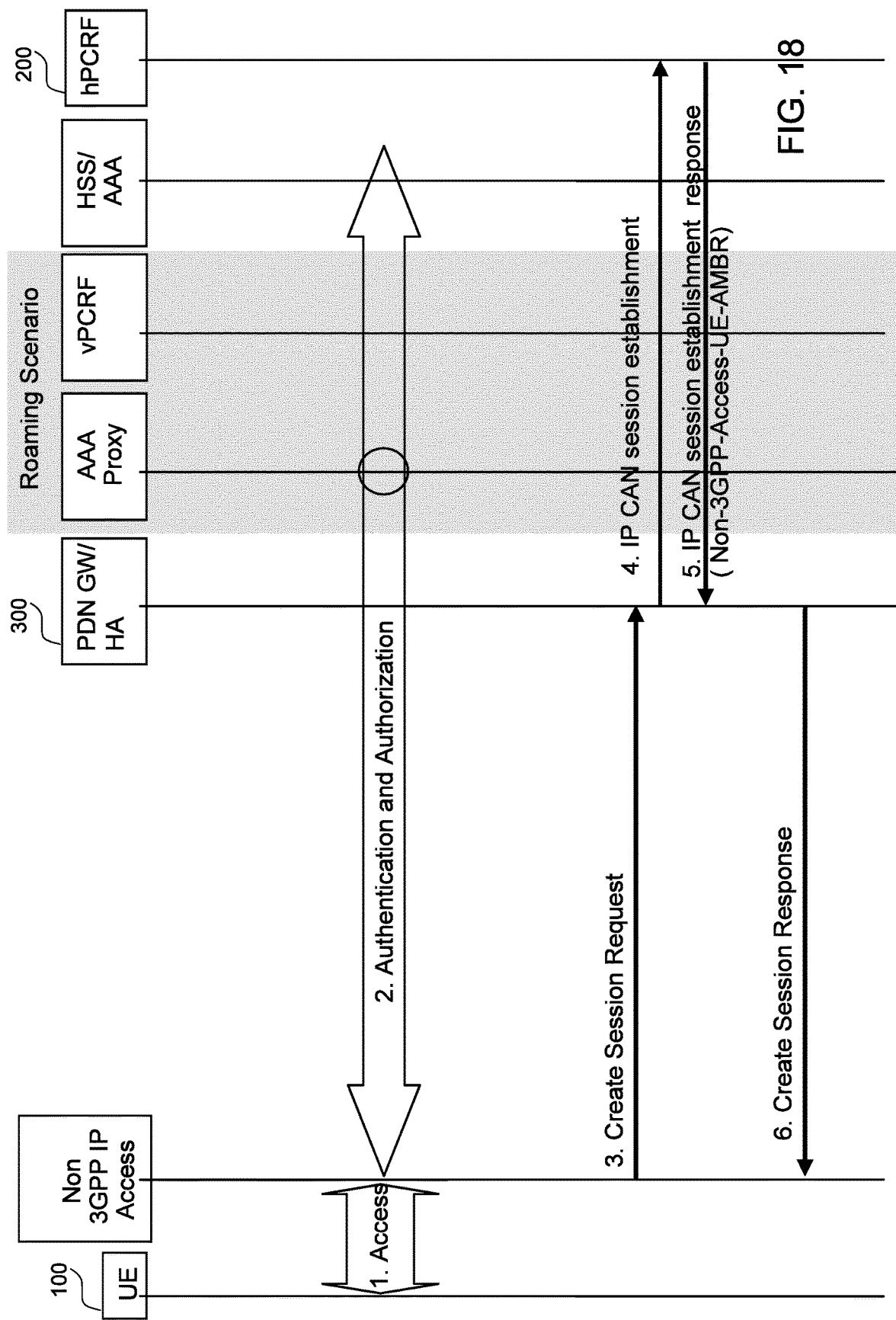
FIG. 18 is a signalling diagram illustrating an embodiment for implementing Non-3GPP-Access-UE-AMBR control.

According to step 1 of FIG. 18, the UE 100 attaches in a non-3GPP access, e.g. Wi-Fi. In step 2 of FIG. 18, the UE 100 is authenticated in the attached network.

In step 3 of FIG. 18, a create session request is initiated from the non-3GPP access toward the PDN GW 300. Responsive to the create session request, in step 4 of FIG. 18, the PDN GW 300 sends an IP-CAN session establishment message to the PCRF 200.

In step 5 of FIG. 18, the PCRF 200 downloads policies to the PDN GW 300 and also the Non-3GPP-Access-UE-AMBR value.

In step 6 of FIG. 18, the PDN connection is established based on the create session response sent from the PDN GW 300 to the Non-3GPP access, and the Non-3GPP-Access-UE-AMBR value is sent to the UE 100 where it is enforced.

In the above embodiments, when the UE 100 attaches to a 3GPP access, the PCRF 200 may receive the subscribed (3GPP) UE-AMBR value (corresponding to the UE-AMBR) from the MME/SGSN. Conventionally, this may not be possible as the PCRF 200 does not know about the subscribed (3GPP) UE-AMBR since this is a value stored in the HSS and downloaded from the HSS to the SGSN/MME at session establishment. However, using a direct interface between the SGSN/MME and the PCRF, as proposed in WO 2014/169933 A1 and described above, the subscribed (3GPP) UE-AMBR value may be conveyed to the PCRF 200. As such, the PCRF 200 may consider the subscribed UE-AMBR value received via the direct interface to calculate the Multi-Access-UE-AMBR that should be as the maximum the subscribed (3GPP) UE-AMBR plus Non-3GPP UE-AMBR.

As described above, the proposed solution is based on the provisioning of the Multi-Access-UE-AMBR and/or the Non-3GPP-Access-UE-AMBR in the UE 100. This provisioning is needed when the UE 100 accesses the communications network through at least two different accesses, as part of the same PDN connection (IFOM) as described above in FIGS. 15 and 16, or in separate PDN connections as described above in FIG. 17, or the UE 100 uses only a non-3GPP access as described in FIG. 18.

The PCRF 200 may indicate the Multi-Access-UE-AMBR and/or the Non-3GPP-UE-AMBR according to the following scenarios:

(1) The UE 100 establishes a PDN connection through a 3GPP access. In this case it is proposed to include the Multi-Access-UE-AMBR and/or the Non-3GPP-UE-AMBR as part of the Gx interface between the PCRF node and the PDN Gateway and as part of the Protocol-Configuration-Option (PCO) indicator as described in TS 24.008 (V.13.2.0). Here, the PCO is sent between the PDN GW 300 and the UE 100.

(2) The UE 100 establishes a PDN connection through a Trusted non-3GPP access. In this case it is proposed to include the Multi-Access-UE-AMBR and/or the Non-3GPP-UE-AMBR as part of the Gx interface between the PCRF node and the PDN Gateway and as part of the Protocol-Configuration-Option (PCO) indicator. The PCO is sent between the PDN GW 300 and the TWAG. Besides, regarding the process as to how to convey this information from the TWAG to the UE, two scenarios are possible: (i) When the WLCP protocol is supported between the TWAG and the UE, the PCO is also supported and it is thus possible to convey the Multi-Access-UE-AMBR as part of the PCO; (ii) When the WLCP protocol is not supported between the TWAG and the UE, the interface to be used between the TWAG and the UE 100 is out of scope of 3GPP. The consequence is that it may not be ensured that the UE will get the Multi-Access-UE-AMBR. If the operator knows that the non-3GPP access could not provide the info to the UE, it should use the 3GPP access for that.

(3) The UE 100 establishes a PDN connection through an Untrusted non-3GPP access. In this case it is proposed to include the Multi-Access-UE-AMBR and/or the Non-3GPP-UE-AMBR as part of the Gx interface between the PCRF node and the PDN Gateway and as part of the Protocol-Configuration-Option (PCO) indicator sent between the PDN GW 300 and the ePDG.

A situation in which the non-3GPP access does not support to convey the Multi-Access-UE-AMBR value and/or the Non-3GPP-UE-AMBR value may be known to by the PCRF 200 based on a reception of PCO information from the UE. In that case, the PCRF shall use the 3GPP access to convey the Multi-Access-UE-AMBR to the UE. On the other hand, the 3GPP operator would also need to know whether the UE supports the Multi-Access-UE-AMBR and/or Non-3GPP-Access-UE-AMBR enforcement. A corresponding information is supplied by the UE as part of the PCO provided by the UE during the attach procedure.

According to the above, the Gx interface is accordingly enhanced with 4 new Attribute Value Pairs (AVP):
Non-3GPP-Access-UE-AMBR-DL AVP: Signed Integer 4 Bytes
Non-3GPP-Access-UE-AMBR-UL AVP: Signed Integer 4 Bytes
Multi-Access-UE-AMBR-DL AVP: Signed Integer 4 Bytes
Multi-Access-UE-AMBR-UL AVP: Signed Integer 4 Bytes These AVP values shall be sent as part of the Re-Auth-Request (RAR) and Credit-Control-Answer (CCA) messages defined in the 3GPP Gx specification 3GPP TS 29.212 (V.13.2.0).

Moreover, the general format of the PCOs described above may be found in 3GPP TS 24.008 (V.13.2.0). As specified therein, additional parameters may be included when special parameters and/or requests (associated with a PDP context) need to be transferred between the UE and the network. The following 4 new parameters should thus be added
Non-3GPP-Access-UE-AMBR-DL AVP: Signed Integer 4 Bytes
Non-3GPP-Access-UE-AMBR-UL AVP: Signed Integer 4 Bytes
Multi-Access-UE-AMBR-DL AVP: Signed Integer 4 Bytes
Multi-Access-UE-AMBR-UL AVP: Signed Integer 4 Bytes Further, the SPR node is the repository that is used by the PCRF node 200, and where the subscription profiles are stored. The subscription profile and policies are accordingly extended with regard to the Non-3GPP-Access-UE-AMBR and the Multi-Access-UE-AMBR values. In particular, for each subscriber, as part of the subscriber subscription, it shall be indicated:

Non-3GPP-Access-UE-AMBR-DL AVP: Integer
Non-3GPP-Access-UE-AMBR-UL AVP: Integer
Multi-Access-UE-AMBR-DL AVP: Integer
Multi-Access-UE-AMBR-UL AVP: Integer In the following, FIG. 19 illustrates a flow diagram of a further embodiment with regard to the establishment of a PDN connection through the 3GPP network.

Figure 19:
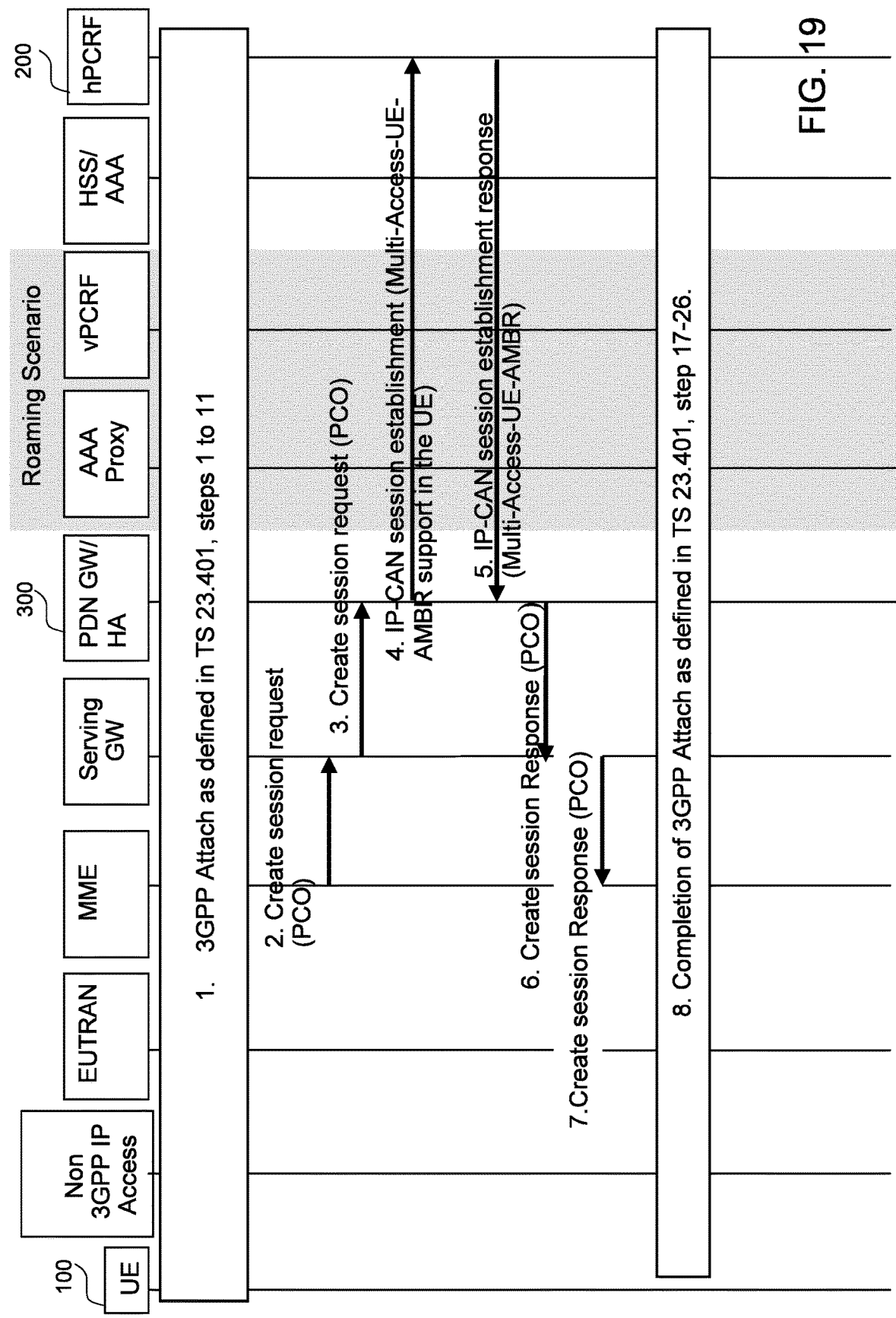
FIG. 19 is a signalling diagram illustrating an embodiment for establishing a PDN connection through the 3GPP network.

In particular, in step 1 of FIG. 19 the UE 100 accesses the 3GPP network according to the current procedures as defined in TS 23.401 (V.13.3.0, steps 1 to 11). This access includes a PCO indicator that indicates "Multi-Access-UE-AMBR support", if the UE 100 supports the Multi-Access-UE-AMBR enforcement.

In step 2 of FIG. 19, the MME node requests the creation of a corresponding session towards the SGW node. The PCO indicator that indicates "Multi-Access-UE-AMBR support" is included in this request.

In step 3 of FIG. 19, the SGW node forwards the Create Session Request to the PDN GW 300.

In step 4 of FIG. 19, the PDN GW 300 initiates the establishment of the IP-CAN session with the PCRF 200. This request includes an indication of the "Multi-Access-UE-AMBR support" of the UE 100, as obtained from the PCO indicator received in step 3.

In step 5 of FIG. 19, the PCRF node 200 checks if the UE 100 supports the enforcement of Multi-Access-UE-AMBR and whether there is a Multi-Access-UE-AMBR stored as part of the user profile (a corresponding interaction with the SPR is not shown in FIG. 19). If there is UE support and if there is an available Multi-Access-UE-AMBR, the PCRF node 200 provides the Multi-Access-UE-AMBR to the PDN GW 300, responsive to the IP-CAN session establishment request. In addition, the PCRF 200 may check whether the Multi-Access-UE-AMBR has already been provided to the UE 100, for example because the UE is already connected via a non-3GPP access and the Multi-Access-UE-AMBR has been sent when this non-3GPP connection was established). In the latter case, the PCRF 200 may omit including the Multi-Access-UE-AMBR again in the IP-CAN session establishment response.

In step 6 of FIG. 19, a create session response is sent from the PDN GW 300 to the SGW, and the PDN GW 300 includes the Multi-Access-UE-AMBR as part of the PCO information in the response.

In step 7 of FIG. 19, the SGW forwards the create session response including the PCO information to the MME.

In step 8 of FIG. 19, the attach procedure will continue according to the current procedure, as for example defined in TS 23.401 (steps 17 to 26). The PCO information including the Multi-Access-UE-AMBR is thus sent to the UE 100.

Figure 20:
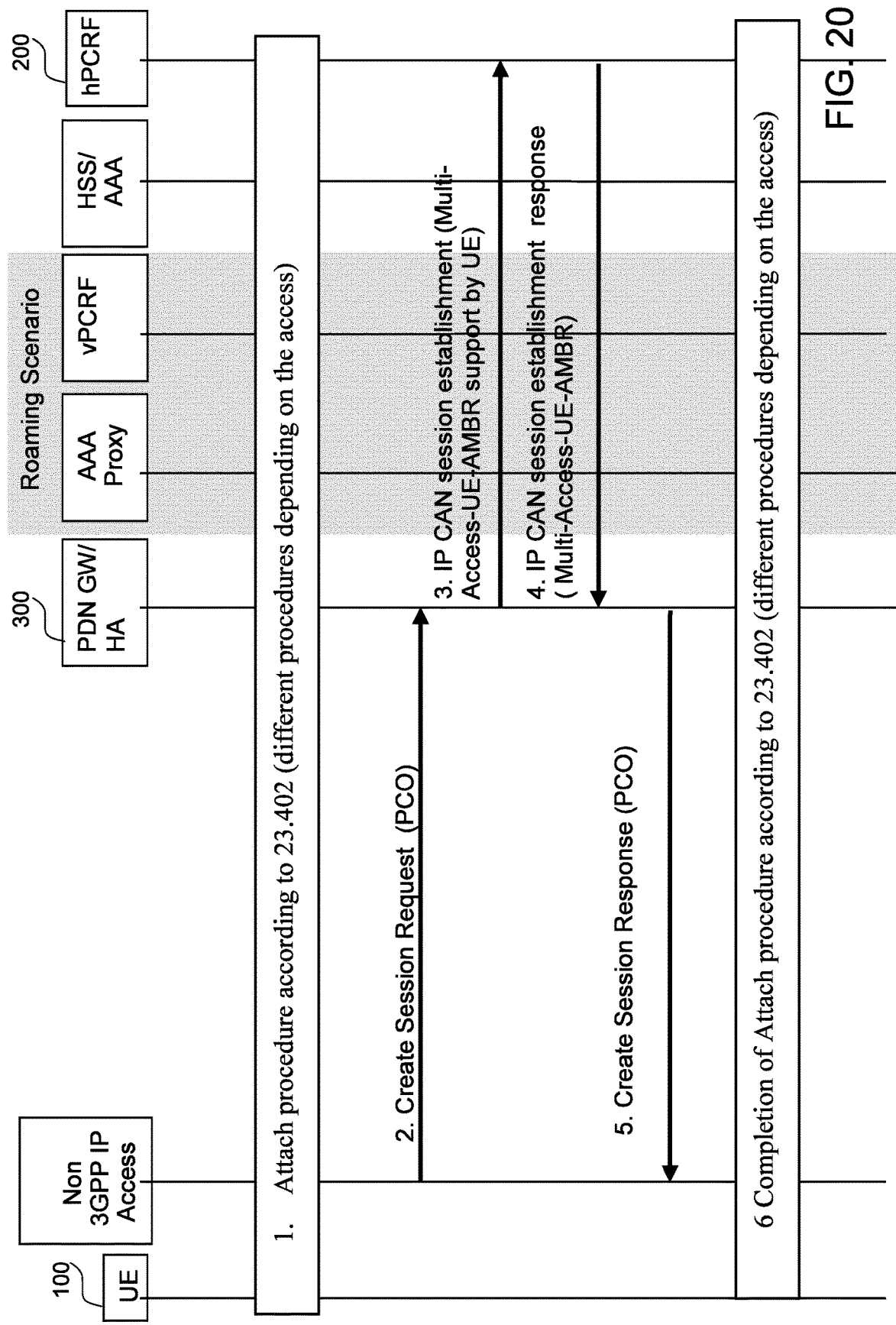
FIG. 20 is a signalling diagram illustrating an embodiment for establishing a PDN connection through a non-3GPP access.

In the following, FIG. 20 illustrates a flow diagram of a further embodiment with regard to the establishment of a PDN connection through a non-3GPP access.

In step 1 of FIG. 20, the UE 100 accesses the non-3GPP network according to current procedures, as for example described in TS 23.402 (including different procedures depending on the access). If the non-3GPP network supports a mechanism to provide the Multi-Access-UE-AMBR, the UE will indicate that it supports Multi-Access-UE-AMBR enforcement, for example via a PCO if supported by the non-3GPP network, e.g. when WLCP is used.

In step 2 of FIG. 20, the non-3GPP access (TWAG/ePDG) sends a create session request to the PDN GW node 300 to request the creation of a corresponding session. If the non-3GPP network receives information that the UE supports Multi-Access-UE-AMBR enforcement, the PCO indication is included with that information.

In step 3 of FIG. 20, the PDN GW 300 initiates the establishment of an IP-CAN session with the PCRF by an IP-CAN session establishment request that includes the indication that the UE supports the Multi-Access-UE-AMBR, if the corresponding PCO is included in step 2.

In step 4 of FIG. 20, the PCRF 200 checks whether the UE 100 supports the Multi-Access-UE-AMBR feature and whether there is a Multi-Access-UE-AMBR value stored as part of the user profile (the corresponding interaction with the SPR is not shown in FIG. 20). If this is the case, the Multi-Access-UE-AMBR is provided with the IP-CAN session establishment response. In addition, the PCRF 200 may check whether the Multi-Access-UE-AMBR value has already been provided to the UE 100 (e.g., in the case that the UE 100 is already connected via a 3GPP access and the Multi-Access-UE-AMBR value was already sent when the connection was established), and in that case the PCRF 200 may omit including the Multi-Access-UE-AMBR value again in the response.

In step 5 of FIG. 20, the PDN GW 300 includes the received Multi-Access-UE-AMBR value in the Create Session Response message as part of the PCO information.

Finally, in step 6 of FIG. 20, the attach procedure according to TS 23.402 (V.13.2.0) is completed.

The above respective modules/units may be implemented by a processing unit that include one or a plurality of processors, a microprocessor or other processing logic that interprets and executes instructions stored in a main memory. The main memory may include a RAM or other type of dynamic storage device that may store information and instructions for execution by the respective modules/units. For example, the enforcement module and/or the monitoring module discussed above with respect to FIGS. 8A and 8B may be realized by the processing unit. The ROM may include a ROM device or another type of static storage device that may store static information and instructions for use by the processing unit.

As mentioned above, the wireless device 100 and the network nodes 200 and 300 may perform certain operations or processes described herein. The wireless device 100 and the nodes 200 and 300 may perform these operations in response to the processing unit executing software instructions contained in a computer-readable medium, such as the main memory, ROM and/or storage device. A computer-readable medium may be defined as a physical or a logical memory device. For example, a logical memory device may include memories within a single physical memory device or distributed across multiple physical memory devices. Each of the main memory, ROM and storage device may include computer-readable media with instructions as program code. The software instructions may be read into the main memory for another computer-readable medium, such as a storage device or from another device via the communication interface.

The software instructions contained in the main memory may cause the processing unit(s) including a data processor, when executed on the processing unit, to cause the data processor to perform operations or processes described herein. Alternatively, hard-wired circuitry may be used in place or on in combination with the software instructions to implement processes and/or operations described herein. Thus, implementations described herein are not limited to any specific combination of hardware and software.

The physical entities according to the different embodiments of the invention, including the elements, units, modules, nodes and systems may comprise or store computer programs including software instructions such that, when the computer programs are executed on the physical entities, steps and operations according to the embodiments of the invention are carried out, i.e. cause data processing means to carry out the operations. In particular, embodiments of the invention also relate to computer programs for carrying out the operations/steps according to the embodiments of the invention, and to any computer-readable medium storing the computer programs for carrying out the above-mentioned methods.

Where the term module is used, no restrictions are made regarding how distributed these elements may be and regarding how gathered these elements may be. That is, the constituent elements/modules/units of the wireless device 100 and the nodes 200 and 300 and systems may be distributed in different software and hardware components or other devices for bringing about the intended function. A plurality of distinct elements/modules may also be gathered for providing the intended functionality. For example, the elements/modules/functions of the UE/nodes may be realized by a microprocessor and a memory similar to the above node including a bus, a processing unit, a main memory, ROM, etc. The microprocessor may be programmed such that the above-mentioned operation, which may be stored as instructions in the memory, are carried out.

Further, the elements/modules/units of the nodes or systems may be implemented in hardware, software, Field Programmable Gate Arrays (FPGAs), Application-Specific Integrated Circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

The invention claimed is:

1. A method in a wireless device having a first radio access and a second radio access to a communications network, the first radio access being a cellular communication access and the second radio access being a non-cellular communication access, the method comprising:

receiving, via one of the first radio access and the second radio access, at least one taken from a group consisting of a Multi-Access User Equipment Aggregated Maximum Bit Rate (Multi-Access-UE-AMBR) value and a User Equipment Aggregated Maximum Bit Rate value for the second radio access, wherein the Multi-Access- UE-AMBR value corresponds to a total maximum bit rate for all traffic generated across the non-cellular communication access and the cellular communication access, wherein the UE-AMBR value corresponds to a maximum bit rate for traffic generated across the non-cellular communication access, and wherein the Multi-Access-UE-AMBR value is a sum of a UE-AMBR value for the cellular communication access of the wireless device and the UE-AMBR value for the non-cellular communication access of said wireless device decided by a Policy Control and Rules Function (PCRF) node; and ensuring that a bit rate of traffic, of at least one of a bit rate of traffic generated by the wireless device and a bit rate of traffic received by the wireless device does not surpass the at least one of the received Multi-Access-UE-AMBR value and the UE-AMBR value for the second radio access.

2. The method of claim 1, further comprising:
monitoring a bit rate of traffic of at least one of a bit rate of traffic sent through the first and the second radio accesses by the wireless device and a bit rate of traffic received through the first and the second radio accesses by the wireless device.

3. The method of claim 1, further comprising at least one of:
reducing a traffic rate of at least one of a bit rate of traffic sent through the first and the second radio accesses and a bit rate of traffic received through the first and the second radio accesses, if a total bit rate of the traffic, of the at least one of the bit rate of the traffic sent through the first and the second radio accesses and the bit rate of the traffic received through said first and said second radio accesses, is higher than said received Multi-Access-UE-AMBR value; and
reducing a traffic rate of at least one of a bit rate of traffic sent through the second radio access and a bit rate of traffic received through the second radio access, if a total bit rate of the traffic, of the at least one of the bit rate of the traffic sent through said second radio access and/or the bit rate of the traffic received through said second radio access, is higher than the received UE-AMBR value for the second radio access.

4. The method of claim 1, wherein the at least one of the Multi-Access-UE-AMBR value and the UE-AMBR value for the second radio access comprises a first value for uplink traffic and a second value for downlink traffic.

5. The method of claim 1, further comprising:
configuring the wireless device to have an IP flow mobility (IFOM) Packet Data Network (PDN) connection being routed over the first radio access and the second radio access.

6. The method of claim 1, further comprising:
initiating a routing rule update by re-negotiating IP flow routing over the first radio access and the second radio access when the bit rate of the traffic, of the at least one of the bit rate of the traffic generated by the wireless device and the bit rate of the traffic received by the wireless device, does surpass the at least one of the received Multi-Access-UE-AMBR value and the UE-AMBR value for the second radio access.

7. The method of claim 1, further comprising:
indicating to the PCRF node of a core network, whether the wireless device supports an enforcement of the least one of the Multi-Access-UE-AMBR value and the UE-AMBR value for the second radio access.

8. The method of claim 1, wherein the first radio access is a 3GPP access and the second radio access is a non-3GPP access.

9. A method in a Policy and Charging Rules Function (PCRF) node, for handling a User Equipment Aggregated Maximum Bit Rate (UE-AMBR) for a wireless device having a first radio access and a second radio access to a communications network, the first radio access being a cellular communication access and the second radio access being a non-cellular communication access, the method comprising:
receiving a subscribed UE-AMBR, the subscribed UE-AMBR being associated with a wireless device subscription of the wireless device;
calculating at least one taken from a group consisting of a Multi-Access User Equipment Aggregated Maximum Bit Rate (Multi-Access-UE-AMBR) value and a UE-AMBR value for the second radio access of the wireless device based on the subscribed UE-AMBR, wherein the Multi-Access-UE-AMBR value corresponds to a total maximum bit rate for all traffic generated across the non-cellular communication access and the cellular communication access, wherein the UE-AMBR value corresponds to a maximum bit rate for traffic generated across the non-cellular communication access, and wherein the Multi-Access-UE-AMBR value is a sum of a UE-AMBR value stored in a Home Subscriber Server/Home Location Register node for the cellular communication access of said wireless device and the UE-AMBR value for the non-cellular communication access of said wireless device which is decided by the PCRF node; and
transmitting the at least one of the calculated Multi-Access-UE-AMBR value and the UE-AMBR value to the wireless device, wherein the transmitted at least one of the calculated Multi-Access-UE-AMBR value and the UE-AMBR value are enforced in the wireless device.

10. The method of claim 9, further comprising:
determining whether the wireless device supports an enforcement of the least one of the Multi-Access-UE-AMBR value and the UE-AMBR value for the second radio access.

11. The method of claim 9, further comprising:
deciding which of the first and the second radio accesses of the wireless device to use to send the calculated at least one of the Multi-Access-UE-AMBR value and the UE-AMBR value for the second radio access.

12. The method of claim 9, further comprising:
detecting an event in the PCRF node, the event having an impact on the at least one of the Multi-Access-UE-AMBR value and the UE-AMBR value for the second radio access.

13. The method of claim 9, further comprising:
determining whether the PCRF node has previously transmitted the at least one of the Multi-Access-UE-AMBR value and the UE-AMBR value for the second radio access.

14. The method of claim 9, wherein the at least one of the Multi-Access-UE-AMBR value and the UE-AMBR value for the second radio access is determined based on at least one of policies and subscription information received from a Subscriber Profile Repository (SPR) and information indicating an active Packet Data Network (PDN) connection associated with the wireless device, and at least one taken from a group consisting of a previous Multi-Access-UE-AMBR value and a previous UE-AMBR value for the second radio access determined for a previous PDN connection associated with the wireless device.

15. The method of claim 9, wherein the transmitting further comprises at least one of:
including the at least one of the Multi-Access-UE-AMBR value and the UE-AMBR value for the second radio access as part of a protocol-configurations-option (PCO) indicator when the wireless device establishes a Packet Data Network (PDN) connection through the first radio access of the wireless device; and
including the at least one of the Multi-Access-UE-AMBR value and the UE-AMBR value for the second radio access as part of a PCO indicator when the wireless device establishes a PDN connection through the second radio access.

16. A Policy and Charging Rules Function (PCRF) node, for handling a User Equipment Aggregated Maximum Bit Rate (UE-AMBR) for a wireless device having a first radio access and a second radio access to a communications network, the first radio access being a cellular communication access and the second radio access being a non-cellular communication access, the PCRF node comprising:
a communication module, configured to receive a subscribed UE-AMBR, the subscribed UE-AMBR being associated with a wireless device subscription of the wireless device; and
a calculating module, configured to calculate at least one taken from a group consisting of a Multi-Access User Equipment Aggregated Maximum Bit Rate (Multi-Access-UE-AMBR) value and a UE-AMBR value for the second radio access of the wireless device based on the subscribed UE-AMBR, wherein the Multi-Access-UE-AMBR value corresponds to a total maximum bit rate for all traffic generated across the non-cellular communication access and the cellular communication access, wherein the UE-AMBR value corresponds to a maximum bit rate for traffic generated across the non-cellular communication access, and wherein the Multi-Access-UE-AMBR value is a sum of a UE-AMBR value stored in a Home Subscriber Server/Home Location Register node for the cellular communication access of said wireless device and the UE-AMBR value for the non-cellular communication access of said wireless device which is decided by the PCRF node,
wherein the communication module is further configured to transmit the at least one of the calculated Multi-Access-UE-AMBR value and the UE-AMBR value to the wireless device, wherein the transmitted at least one of the calculated Multi-Access-UE-AMBR value and the UE-AMBR value are enforced in the wireless device.

17. The PCRF node of claim 16, further comprising a decision module configured to determine whether the wireless device supports an enforcement of the least one of the Multi-Access-UE-AMBR value and the UE-AMBR value for the second radio access.

18. The PCRF node of claim 17, wherein:
the decision module is further configured to decide which of the first and the second radio accesses of the wireless device to use to send the calculated at least one of the Multi-Access-UE-AMBR value and the UE-AMBR value for the second radio access.

19. The PCRF node of claim 16, wherein:
said calculating module is further configured to detect an event in the PCRF node, the event having an impact on the at least one of the Multi-Access-UE-AMBR value and the UE-AMBR value for the second radio access.

20. The PCRF node of claim 17, wherein:
the decision module is further configured to determine whether the PCRF node has previously transmitted the at least one of the calculated Multi-Access-UE-AMBR value and the calculated UE-AMBR value for the second radio access.

21. The PCRF node of claim 16, wherein:
the calculating module is configured to determine the at least one of the Multi-Access-UE-AMBR value and the UE-AMBR value for the second radio access based on at least one of policies and subscription information received from a Subscriber Profile Repository (SPR) and information indicating an active Packet Data Network (PDN) connection associated with the wireless device, and at least one taken from a group consisting of a previous Multi-Access-UE-AMBR value and a previous UE-AMBR value for the second radio access determined for a previous PDN connection associated with the wireless device.

22. The PCRF node of claim 16, wherein to transmit the at least one of the calculated Multi-Access-UE-AMBR value and the UE-AMBR value, the communication module is further configured to perform at least one of:
including the at least one of the Multi-Access-UE-AMBR value and the UE-AMBR value for the second radio access as part of a protocol-configuratons-option (PCO) indicator when the wireless device establishes a Packet Data Networ (PDN) connection through the first radio access of the wireless device; and
including the at least one of the Multi-Access-UE-AMBR value and the UE-AMBR value for the second radio access as part of a PCO indicator when the wireless device establishes a PDN connection through the second radio access.

* * * * *